(12) United States Patent
Maeto

(10) Patent No.: US 12,525,253 B2
(45) Date of Patent: Jan. 13, 2026

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/829,850

(22) Filed: Sep. 10, 2024

(65) Prior Publication Data
US 2025/0299690 A1    Sep. 25, 2025

(30) Foreign Application Priority Data
Mar. 21, 2024   (JP) ................... 2024-045267

(51) Int. Cl.
G11B 27/36    (2006.01)
G11B 5/012    (2006.01)
G11B 5/02     (2006.01)

(52) U.S. Cl.
CPC ............. *G11B 5/02* (2013.01); *G11B 5/012* (2013.01)

(58) Field of Classification Search
CPC .. G11B 27/36; G11B 5/54; G11B 5/58; G11B 5/00; G11B 2005/0021; G11B 5/09

USPC .......................................................... 369/48
See application file for complete search history.

(56) References Cited

U.S. PATENT DOCUMENTS

| | | |
|---|---|---|
| 7,982,994 B1 | 7/2011 | Erden et al. |
| 8,885,277 B1 | 11/2014 | Erden et al. |
| 9,858,962 B1 | 1/2018 | Okubo |
| 10,803,896 B1 | 10/2020 | Mohl |
| 11,495,249 B1 | 11/2022 | Gilbert et al. |
| 2015/0029612 A1 | 1/2015 | Haines |

FOREIGN PATENT DOCUMENTS

| | | | | |
|---|---|---|---|---|
| JP | 2023098842 | * | 7/2023 | ..... G11B 2005/0021 |
| JP | 2023098842 A | * | 7/2023 | ............ G11B 13/08 |

* cited by examiner

*Primary Examiner* — Nabil Z Hindi
(74) *Attorney, Agent, or Firm* — Kim & Stewart LLP

(57) ABSTRACT

According to one embodiment, a magnetic head executes a magnetization operation of magnetizing a magnetic disk to one of a first polarity and a second polarity opposite the first polarity. The magnetization operation includes a first magnetization operation of magnetizing the disk with a first recording width and a second magnetization operation of magnetizing the disk with a second recording width larger than the first recording width. The controller magnetizes a first area unit to the first or second polarity in the first or second magnetization operation, and then magnetizes a second area unit to a polarity opposite to that of the first area unit in the second magnetization operation. The second area unit is an area unit, radially adjacent to the first area unit, included in a second track that is a track adjacent to a first track among tracks and to be written after the first track.

16 Claims, 13 Drawing Sheets

| WRITE PATTERN | | WRITE CURRENT | |
|---|---|---|---|
| DIGIT AREA Da (TRACK #i) | DIGIT AREA Db (TRACK #i+1) | DIGIT AREA Da (TRACK #i) | DIGIT AREA Db (TRACK #i+1) |
| -1 | -1 | $WC_{-1}/WC_{-2}$ | $WC_{-1}$ |
| 0 | -1 | $WC_1/WC_2$ | $WC_{-2}$ |
| 1 | -1 | $WC_1/WC_2$ | $WC_{-1}$ |
| -1 | 0 | $WC_{-1}/WC_{-2}$ | - |
| 0 | 0 | - | - |
| 1 | 0 | $WC_1/WC_2$ | - |
| -1 | 1 | $WC_{-1}/WC_{-2}$ | $WC_1$ |
| 0 | 1 | $WC_{-1}/WC_{-2}$ | $WC_2$ |
| 1 | 1 | $WC_1/WC_2$ | $WC_1$ |

FIG.13

| BEFORE CONVERSION | | | AFTER CONVERSION | |
|---|---|---|---|---|
| -1 | -1 | -1 | -1 | -1 |
| -1 | -1 | 1 | -1 | 0 |
| -1 | 1 | -1 | -1 | 1 |
| -1 | 1 | 1 | 0 | -1 |
| 1 | -1 | -1 | 0 | 1 |
| 1 | -1 | 1 | 1 | -1 |
| 1 | 1 | -1 | 1 | 0 |
| 1 | 1 | 1 | 1 | 1 |

WRITE DATA OF TRACK #p  WRITE DATA OF TRACK #p+1

MAGNETIC DISK DEVICE

CROSS-REFERENCE TO RELATED APPLICATIONS

This application is based upon and claims the benefit of priority from Japanese Patent Application No. 2024-045267, filed on Mar. 21, 2024; the entire contents of which are incorporated herein by reference.

FIELD

Embodiments described herein relate generally to a magnetic disk device.

BACKGROUND

In the related art, in a magnetic disk device, data expressed in a binary number is written to a magnetic disk.

BRIEF DESCRIPTION OF THE DRAWINGS

FIG. 13 is a diagram for describing an example of a method of generating write data executed by the controller according to a second embodiment;

DETAILED DESCRIPTION

In general, according to one embodiment, a magnetic disk device includes a magnetic disk, a magnetic head, and a controller. The magnetic disk is provided with a plurality of tracks, and each of the plurality of tracks includes a plurality of area units arranged along a corresponding track. The magnetic head is configured to execute a magnetization operation of magnetizing the magnetic disk to one of a first polarity and a second polarity that is a polarity opposite to the first polarity. The magnetization operation includes a first magnetization operation of magnetizing the magnetic disk with a first recording width and a second magnetization operation of magnetizing the magnetic disk with a second recording width larger than the first recording width. The controller is configured to be capable of executing any write operation of a first write operation of writing a first value to a first area unit that is one area unit included in a first track that is one track of the plurality of tracks, a second write operation of writing a second value different from the first value to the first area unit, and a third write operation of writing a third value different from the first and second values to the first area unit. In the first write operation, the controller is configured to magnetize the first area unit to the first polarity in the first magnetization operation or the second magnetization operation. In the second write operation, the controller is configured to magnetize the first area unit to the second polarity in the first magnetization operation or the second magnetization operation. In the third write operation, the controller is configured to magnetize the first area unit to either the first polarity or the second polarity in the first magnetization operation or the second magnetization operation, and then magnetize a second area unit to a polarity opposite to a polarity of the first area unit in the second magnetization operation. The second area unit is an area unit, radially adjacent to the first area unit, included in a second track that is a track adjacent to the first track among the plurality of tracks and to be written after the first track.

Exemplary embodiments of a magnetic disk device will be explained below in detail with reference to the accompanying drawings. The present invention is not limited to the following embodiments.

First Embodiment

Figure 1:
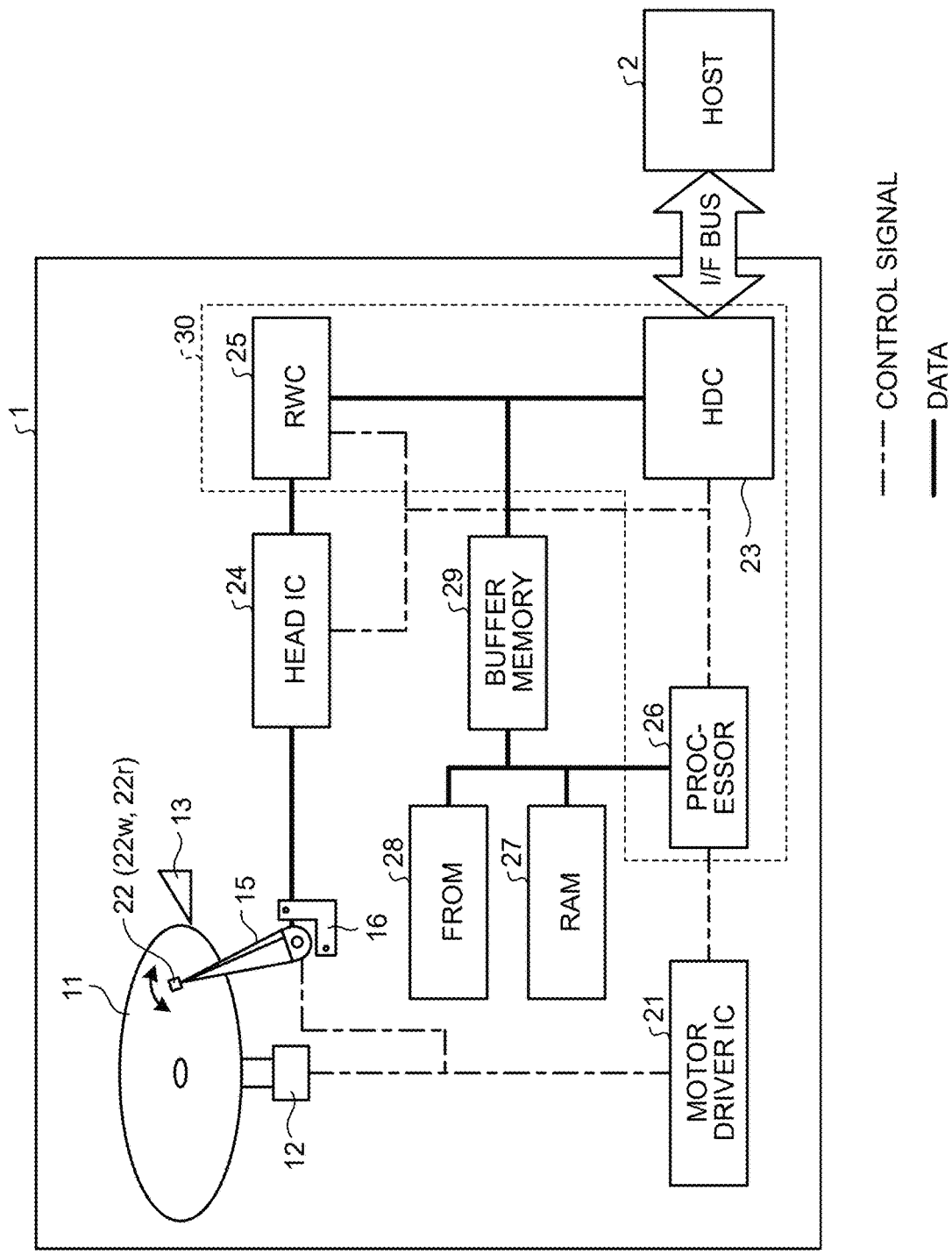
FIG. 1 is a schematic diagram illustrating an example of a configuration of a magnetic disk device according to a first embodiment.

FIG. 1 is a schematic diagram illustrating an example of a configuration of a magnetic disk device 1 according to the first embodiment.

The magnetic disk device 1 is connected to a host 2. The magnetic disk device 1 can receive an access command such as a write command or a read command from the host 2.

The magnetic disk device 1 includes a magnetic disk 11 having a recording face formed on a face thereof. The magnetic disk device 1 writes and reads data to and from the magnetic disk 11 (more precisely, the recording face of the magnetic disk 11) in response to the access command. Note that the magnetic disk device 1 may include a plurality of magnetic disks 11, but in the embodiment, the magnetic disk device 1 includes one magnetic disk 11 for the sake of simplicity of description and illustration.

Data is written and read via a magnetic head 22. Specifically, in addition to the magnetic disk 11, the magnetic disk device 1 includes a spindle motor 12, a motor driver integrated circuit (IC) 21, a magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21.

The motor driver IC 21 controls the rotation of the spindle motor 12 and the rotation of the VCM 16.

The magnetic head 22 writes and reads data to and from the magnetic disk 11 using a write element $22w$ and a read element $22r$ provided therein. The magnetic head 22 is attached to a distal end of the actuator arm 15. The magnetic head 22 is moved along the radial direction of the magnetic disk 11 by the VCM 16 driven by the motor driver IC 21.

For example, when the rotation of the magnetic disk 11 is stopped, the magnetic head 22 is moved onto the ramp 13. The ramp 13 is configured to hold the magnetic head 22 at a position spaced apart from the magnetic disk 11.

The head IC 24 amplifies and outputs a signal read from the magnetic disk 11 by the magnetic head 22 at the time of reading, and supplies the signal to the RWC 25. In addition, the head IC 24 amplifies a signal corresponding to the data to be written supplied from the RWC 25 and supplies the amplified signal to the magnetic head 22.

The HDC 23 performs control of transmission and reception of data with the host 2 via the I/F bus, control of the buffer memory 29, error correction processing of read data, and the like.

The buffer memory 29 is used as a buffer for data to be transmitted to and received from the host 2. For example, the buffer memory 29 is used to temporarily store data to be written to the magnetic disk 11 or data read from the magnetic disk 11.

The buffer memory 29, for example, includes a volatile memory capable of high-speed operation. The type of the memory constituting the buffer memory 29 is not limited to a specific type. The buffer memory 29 can be configured by, for example, a dynamic random access memory (DRAM), a static random access memory (SRAM), or a combination thereof.

The RWC 25 modulates data to be written supplied from the HDC 23 and supplies the modulated data to the head IC 24. In addition, the RWC 25 demodulates a signal read from the magnetic disk 11 and supplied from the head IC 24 to output the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. The firmware may be stored in the magnetic disk 11.

The RAM 27 includes, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk device 1 according to a firmware stored in the FROM 28 or the magnetic disk 11. For example, the processor 26 loads firmware from the FROM 28 or the magnetic disk 11 to the RAM 27, and executes control of the motor driver IC 21, the head IC 24, the RWC 25, the HDC 23, and the like according to the loaded firmware.

Note that a configuration including the RWC 25, the processor 26, and the HDC 23 can also be regarded as a controller 30. The controller 30 may be configured as a system-on-a-chip (SoC). The controller 30 is not necessarily configured as an SoC. In addition to these components, the controller 30 may include other components (for example, the RAM 27, the FROM 28, the buffer memory 29, the RWC 25, or the like).

Figure 2:
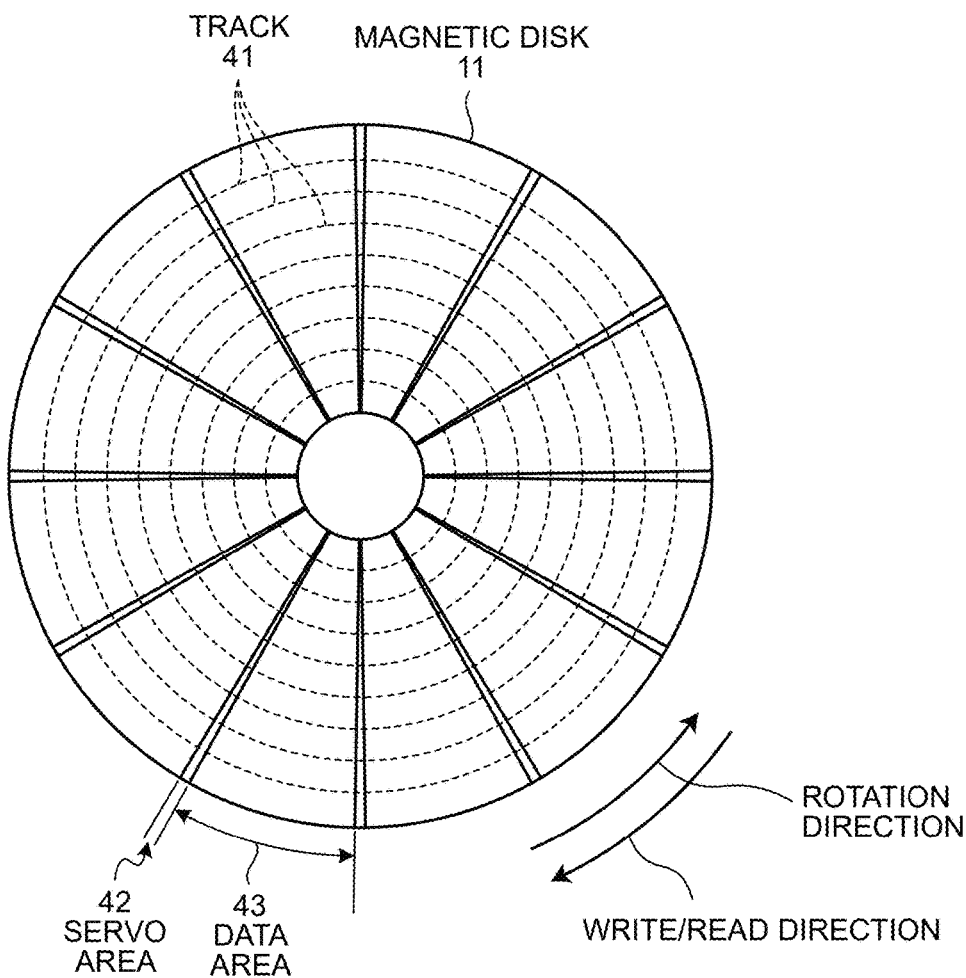
FIG. 2 is a schematic diagram illustrating an example of a configuration of a magnetic disk according to the first embodiment.

FIG. 2 is a schematic diagram illustrating an example of a configuration of the magnetic disk 11 according to the first embodiment. This figure illustrates an example of the rotation direction of the magnetic disk 11. The magnetic head 22 moves relative to the magnetic disk 11 by the rotation of the magnetic disk 11. Therefore, the write/read direction, that is, the direction in which data is written or read by the magnetic head 22 along the circumferential direction is opposite to the rotation direction of the magnetic disk 11.

Servo information is written to the magnetic disk 11 by, for example, a servo writer or self-servo write (SSW) in a manufacturing process. FIG. 2 illustrates servo areas 42 radially arranged as an example of the arrangement of the servo areas in which the servo information is written. A data area 43 in which data can be written is provided between the servo areas 42.

In the radial direction of the magnetic disk 11, a plurality of concentric tracks 41 is set based on the servo information. A plurality of sectors in which data is written is arranged in the plurality of data areas 43 provided along the track 41.

As a method for writing data on a magnetic disk, a method called shingled magnetic recording (SMR) and a method called conventional magnetic recording (CMR) are known.

Figure 3:
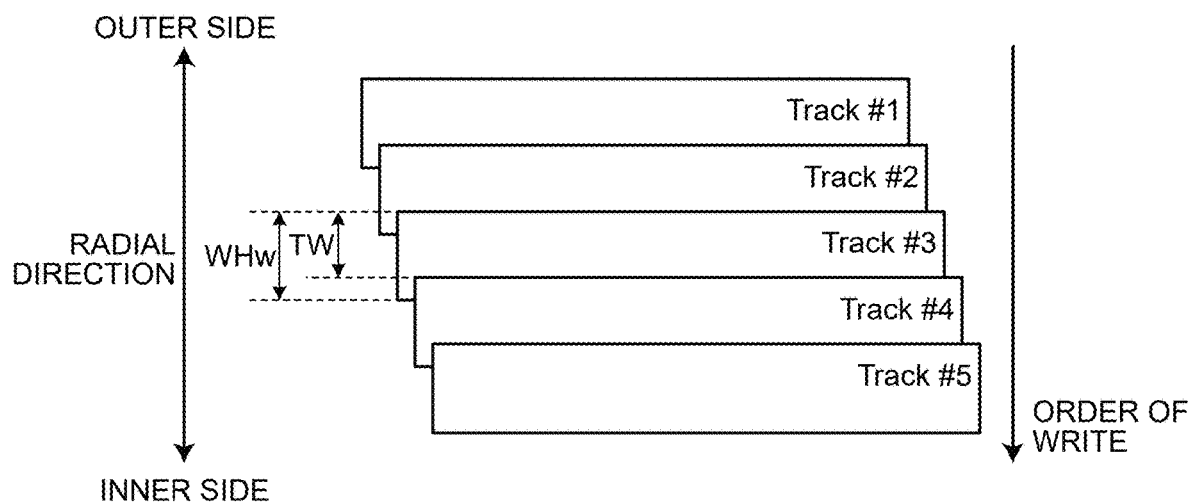
FIG. 3 is a schematic diagram for describing an SMR method used in the magnetic disk device according to the first embodiment.

FIG. 3 is a schematic diagram for describing an SMR method used in the magnetic disk device 1 of the first embodiment. In the SMR method, in a case where data (referred to as first data) of a certain track 41 is written and then data (referred to as second data) of a track 41 radially adjacent to the track 41 is written, respective tracks 41 are arranged such that the second data overlaps part of the first data. That is, according to the SMR method, data of one track 41 of the two tracks 41 adjacent to each other in the radial direction of the magnetic disk 11 is written to overlap part of data of another track of the two tracks 41.

For example, the data of the track #2 is written so as to overlap part of the already written data of the track #1. In addition, the data of the track #3 is written so as to overlap part of the already written data of the track #2. That is, according to the SMR method, data of one track repeatedly overlaps part of data of the already written adjacent track.

As a result, each track width TW is narrowed compared to the width (WHw) of the write element $22w$, and the recording density is improved.

However, according to the SMR method, since the track width TW is narrower than the width WHw of the write element $22w$, when part of data of a plurality of tracks is updated, data of a track adjacent to the updated data is destroyed. In order to prevent data destruction, data of a plurality of tracks including the part of data is collectively updated. An area of a plurality of tracks which is collectively updated is referred to as a band.

In addition, according to the SMR method, it is determined that writing can be executed only from one of the outer side end portion the and the inner side end portion of the magnetic disk determined in advance toward the other determined in advance of the plurality of tracks 41 in one band. In the example illustrated in FIG. 3, write is executed in units of tracks 41 from the outer side end portion toward the inner side end portion. The controller 30 may be configured such that write is executed in units of tracks 41 from the inner side end portion toward the outer side end portion. In addition, the order of writ may be individually set for each band.

Figure 4:
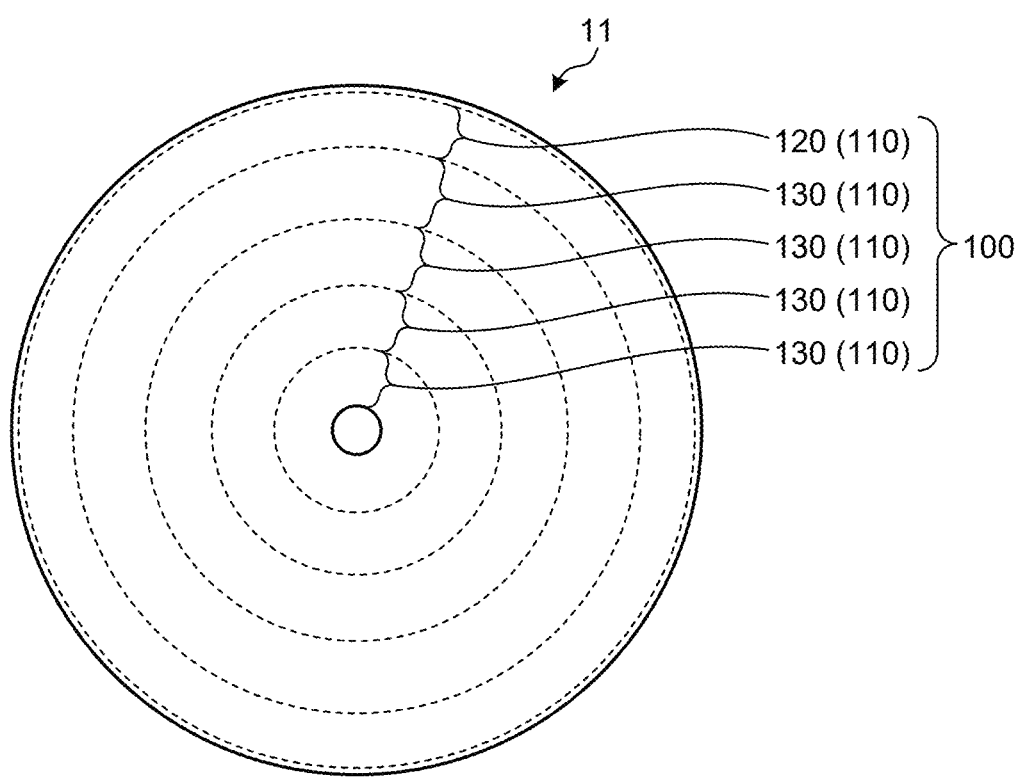
FIG. 4 is a diagram illustrating an example of a plurality of band areas provided in the magnetic disk according to embodiments.
Figure 5:
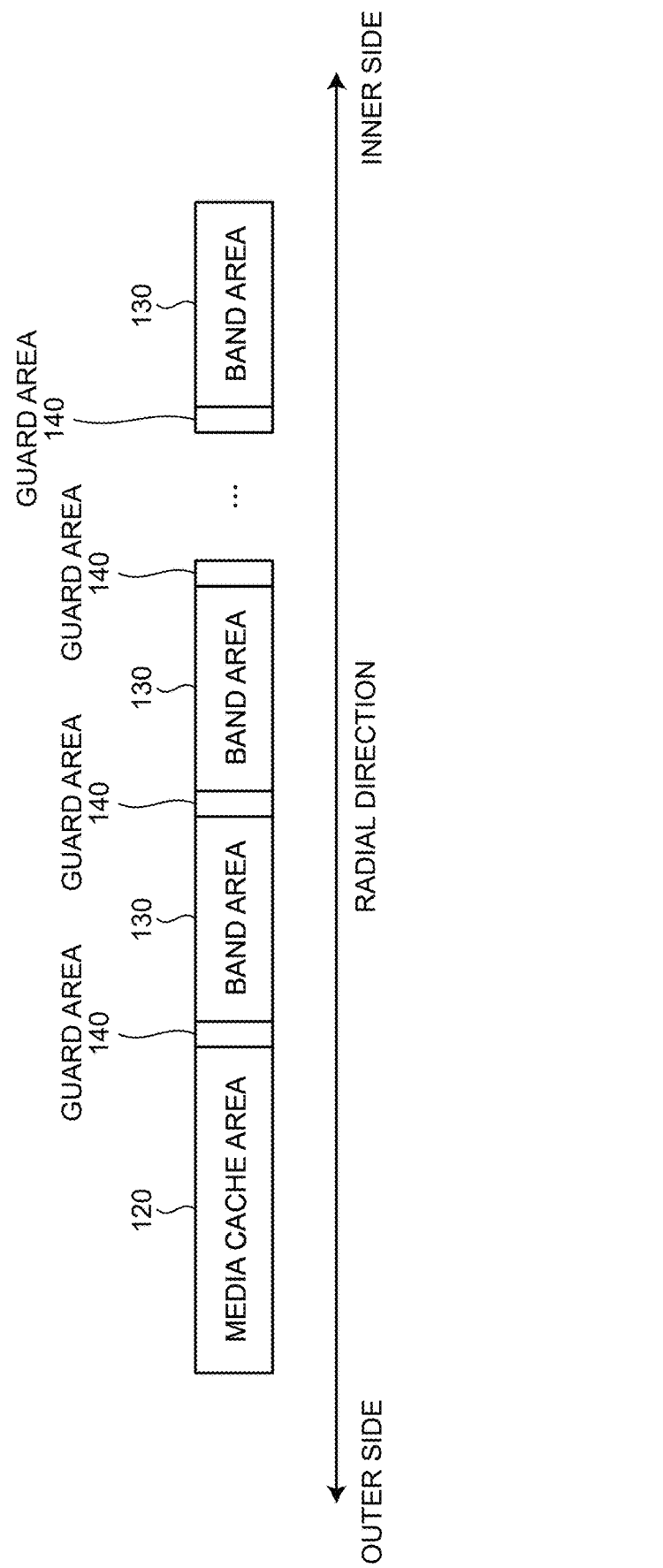
FIG. 5 is another diagram illustrating an example of a plurality of band areas provided in the magnetic disk according to the embodiments.

FIGS. 4 and 5 are diagrams illustrating examples of a plurality of band areas provided in the magnetic disk 11 according to the embodiment.

A recording face 100 of the magnetic disk 11, that is, an area where the track 41 may be arranged, is divided into a plurality of storage areas 110 in the radial direction. The plurality of storage areas 110 includes one media cache area 120 and a plurality of band areas 130. An area called a guard area 140 that cannot be designated as a write destination from the host 2 is provided between the storage areas 110.

The storage area 110 provided on the outermost side in the radial direction in the recording face 100 is set as the media cache area 120. The media cache area 120 is a storage area used as a temporary storage location of data. Note that the position of the media cache area 120 is not limited to the outermost side. In addition, two or more media cache areas 120 may be provided on the recording face. Data can be written to the media cache area 120 by the CMR method.

One or more of the plurality of storage areas 110 are set as the band area 130. Each band area 130 is provided with a plurality of tracks 41. In each band area 130, data is written to all the tracks 41 by the SMR method. When data is written to each band area 130, it is prohibited to write data from the band area 130 as a write destination to the adjacent band area 130 beyond the guard area 140.

Note that some of the plurality of band areas 130 may be configured such that data is written by the CMR method. Hereinafter, the band area 130 to which data is written by the SMR method will be described.

In a case where writing is performed on the plurality of tracks 41 in one band area 130 by the SMR method, the track 41 located at one end of the plurality of tracks 41 in the radial direction, the write order of which is the first, is referred to as a head track of the band area 130. The track 41 located at the other end of the plurality of tracks 41 in the radial direction, the write order of which is the last, is referred to as an end track of the band area 130.

The data can be regarded as a string including a plurality of values. Then, in the sector of each track 41, a string including a plurality of values is written along the track 41. That is, each sector can be considered to have a structure in which a plurality of area units each capable of holding a single-digit value is arranged in a line along the track 41. Each area unit capable of holding the single-digit value is referred to as a digit area.

When a positive write current is supplied, the magnetic head 22 can magnetize a part where the magnetic head 22 is located on the recording face 100 of the magnetic disk 11 to a positive polarity. When a negative write current is supplied, the magnetic head 22 can magnetize a part where the magnetic head 22 is located on the recording face 100 of the magnetic disk 11 to a negative polarity. The controller 30 controls a write current when the magnetic head 22 passes through each digit area according to a value written to each digit area.

Here, a technique (hereinafter, comparative example) to be compared with the embodiment will be described. According to the comparative example, values that can take two levels per digit area are written. That is, the data is written as information expressed in a binary number on the magnetic disk. More specifically, in the write operation, the polarity of magnetization of the digit area is set to a polarity corresponding to a value of a positive polarity or a negative polarity. In the read operation, whether the polarity of the magnetization of the digit area is positive or negative is determined based on the signal obtained by the magnetic head, and a value corresponding to the polarity obtained by the determination is acquired.

In an embodiment, values that can take three levels per digit area are written. That is, data is written to the magnetic disk 11 as information expressed in ternary numbers. As a result, it is possible to increase the storage capacity without increasing the number of digit areas as compared with the magnetic disk device according to the comparative example.

Figure 6:
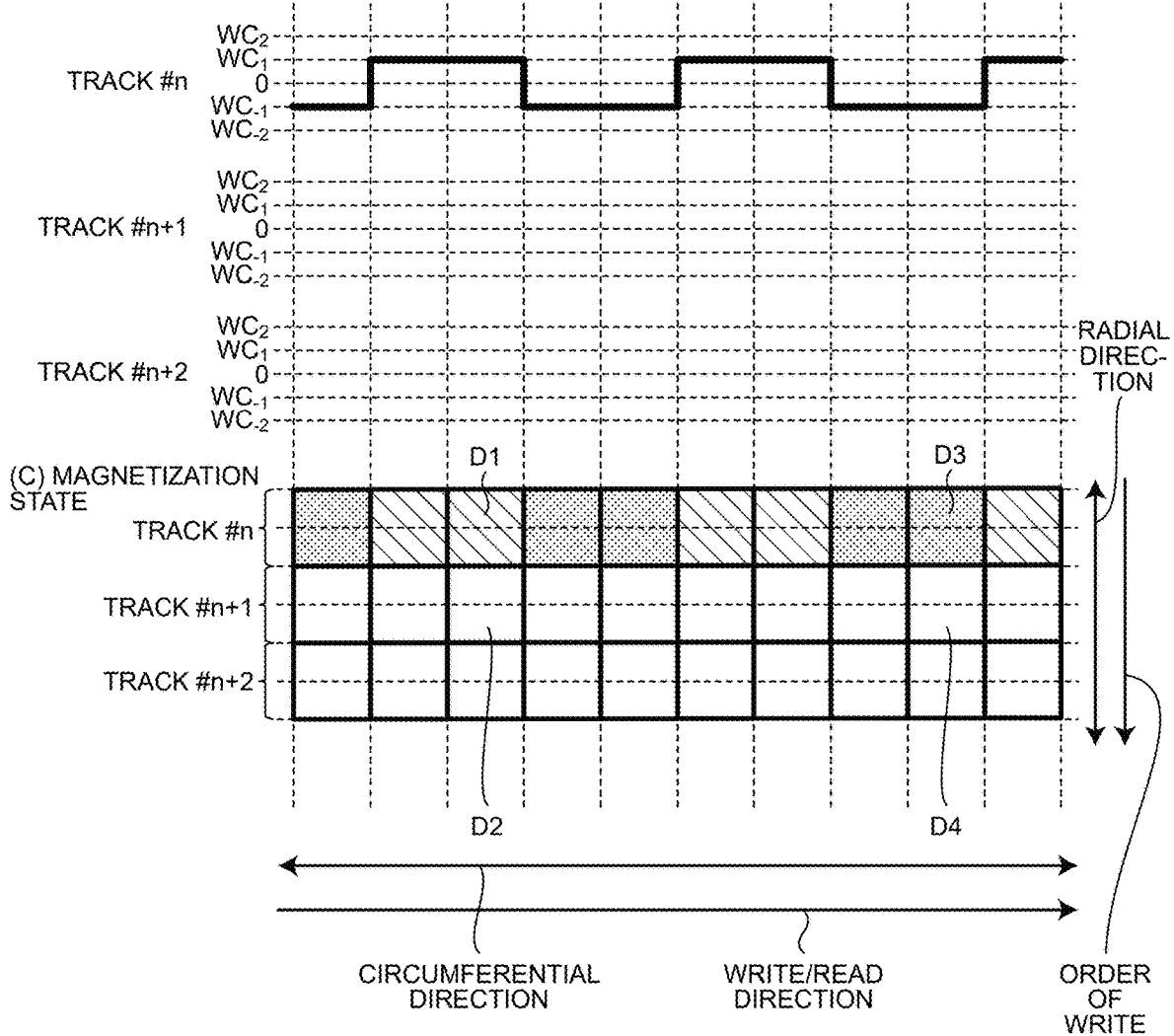
FIG. 6 is a diagram for describing a method of writing ternary information according to the first embodiment.
Figure 7:
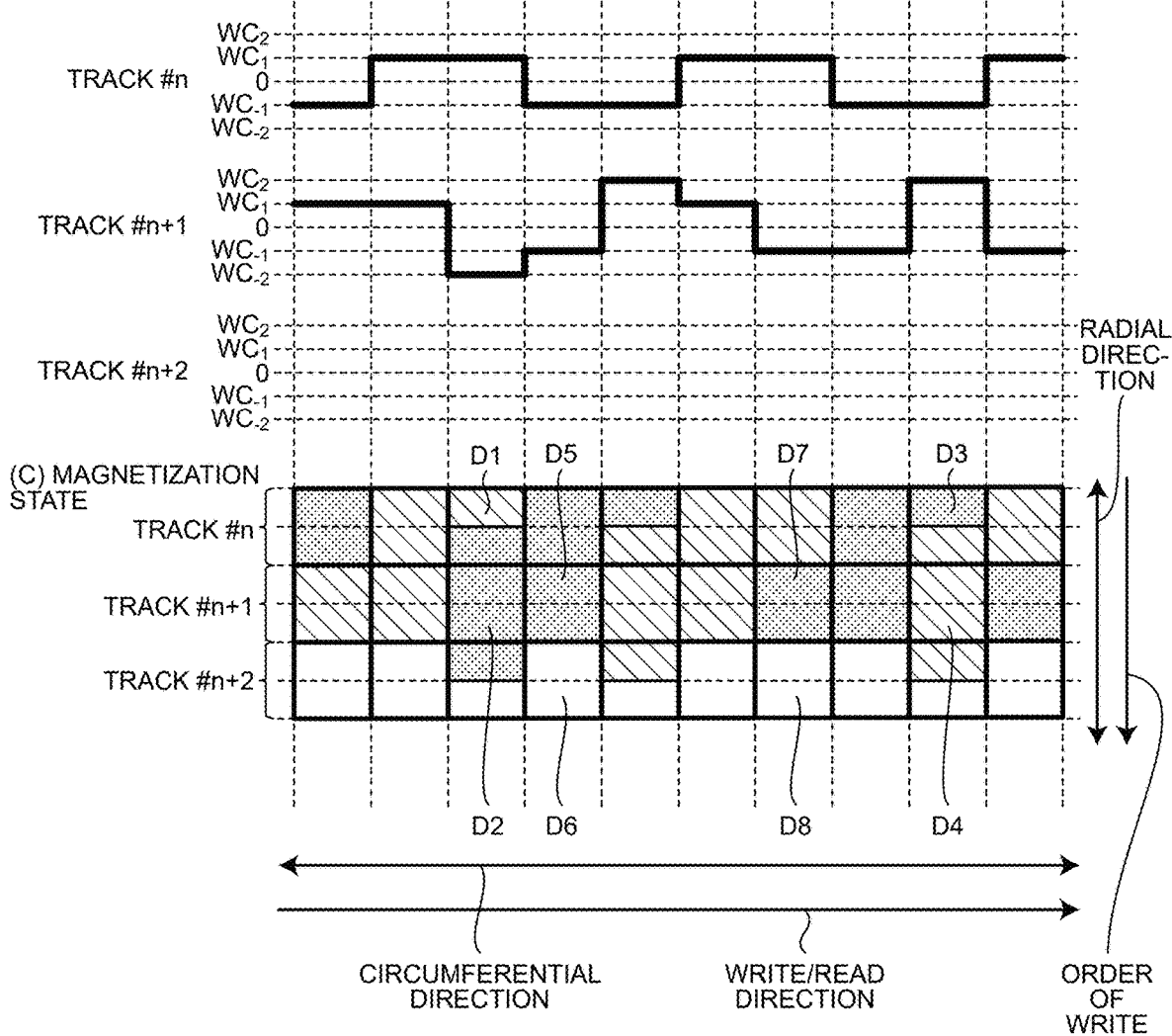
FIG. 7 is another diagram for describing a method of writing ternary information according to the first embodiment.
Figure 8:
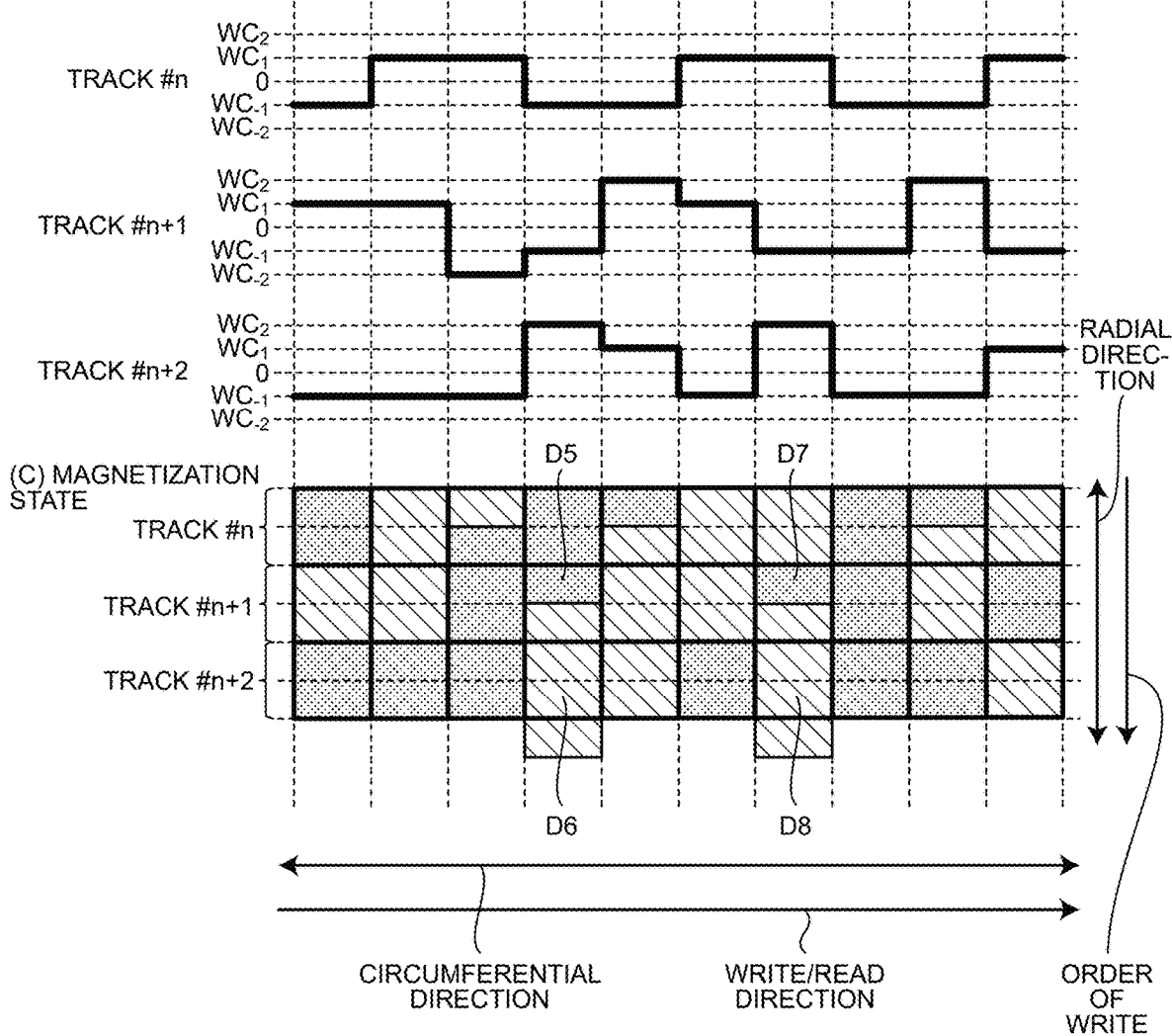
FIG. 8 is still another diagram for describing a method of writing ternary information according to the first embodiment.

FIGS. 6 to 8 are diagrams for describing a method of writing ternary information according to the first embodiment. Note that, in the following description, it is assumed that track numbers corresponding to the arrangement order in the radial direction are given to respective tracks 41, and writing is executed in units of tracks 41 in the order of track numbers in the SMR method.

Here, an example in which ternary information is written to the track #n, the track #n+1, and the track #n+2 which are three tracks consecutive in the radial direction will be described. Data is written to the track #n, the track #n+1, and the track #n+2 in this order.

In addition, in the description of FIG. 6 and subsequent drawings, it is assumed that a value written in one digit area can take "−1", "0", or "1" each associated with a different level. In addition, data written to the track 41 is referred to as write data.

As illustrated in part (A) of FIG. 6 to FIG. 8, the write data for the track #n is a string of values of "−1, 1, 0, −1, 0, 1, 1, −1, 0, 1". The write data for the track #n+1 is a string having values of "1, 1, −1, 0, 1, 1, 0, −1, 1, −1". The write data for the track #n+2 is a string having values of "−1, −1, −1, 1, 1, −1, 1, −1, −1, 1".

In addition, the controller 30 can control the write current supplied to the magnetic head 22 to $WC_2$, $WC_1$, $WC_{-1}$, and $WC_{-2}$. $WC_1$ and $WC_2$ are positive write currents, and the amount of current of $WC_2$ is larger than the amount of current of $WC_1$. In other words, the amount of current is an absolute value of the amplitude of the current value. The $WC_{-1}$ and the $WC_{-2}$ are negative write currents, and the amount of current of the $WC_{-2}$ is larger than the amount of current of the $WC_{-1}$. The amount of current of the $WC_2$ is substantially equal to the amount of current of the $WC_{-2}$. The amount of current of $WC_1$ is substantially equal to the amount of current of $WC_{-1}$.

The amount of current of the $WC_2$ may not be equal to the amount of current of the $WC_{-2}$, and the amount of current of the $WC_1$ may not be equal to the amount of current of the $WC_{-1}$. For example, in a case where the characteristics are different between the positive polarity and the negative polarity, even when the same amount of current is supplied to the magnetic head 22 between the positive polarity and the negative polarity, the same recording quality cannot be obtained. In such a case, the amount of current of the $WC_2$ can be set to be not equal to the amount of current of the $WC_{-2}$, and the amount of current of the $WC_1$ can be set to be not equal to the amount of current of the $WC_{-1}$. In other words, different values can be set for the amount of current of the $WC_2$ and the amount of current of the $WC_{-2}$ in order to obtain the same recording width. Similarly, different values can be set for the amount of current of $WC_1$ and the amount of current of $WC_{-1}$ in order to obtain the same recording width.

The recording width in the radial direction by the magnetic head 22 when the write current of $WC_1$ is supplied is substantially equal to the recording width in the radial direction by the magnetic head 22 when the write current of $WC_{-1}$ is supplied. The recording width in the radial direction by the magnetic head 22 when the write current of $WC_2$ is supplied is substantially equal to the recording width in the radial direction by the magnetic head 22 when the write current of $WC_{-2}$ is supplied. The recording width in the radial direction by the magnetic head 22 when the write current of $WC_2$ or $WC_{-2}$ is supplied is larger than the recording width in the radial direction by the magnetic head 22 when the write current of $WC_1$ or $WC_{-1}$ is supplied.

As illustrated in FIG. 6, first, the controller 30 executes the write operation on the track #n. In the write operation on the track #n, in a case where the value to be written is "1", the controller 30 supplies the write current of $WC_1$ to the magnetic head 22, thereby magnetizing the digit area of the write destination to the positive polarity. In a case where the value to be written is "−1", the controller 30 supplies the write current of $WC_{-1}$ to the magnetic head 22, thereby magnetizing the digit area of the write destination to a negative polarity.

Here, any three digit areas arranged in the radial direction are referred to as a first digit area, a second digit area, and a third digit area. The second digit area is a digit area that is adjacent to the first digit area in the radial direction, and that is included in a track 41 a write order of which is after a track 41 including the first digit area. The third digit area is a digit area that is adjacent to the first digit area in the radial direction and that is included in a track 41 a write order of which is before the track 41 including the first digit area.

In a case where the value written to the first digit area is "0", the controller 30 sets a direction of the write current supplied to the magnetic head 22 when the magnetic head 22 passes through the first digit area to a direction opposite to a direction of the write current supplied to the magnetic head 22 when the magnetic head 22 passes through the second digit area.

Specifically, in a case where the value to be written to the second digit area is "1", the controller 30 sets the write current when the magnetic head 22 passes through the second digit area to a positive current. Therefore, the controller 30 sets the write current when the magnetic head 22 passes through the first digit area to a negative current.

In a case where the value to be written to the second digit area is "−1", the controller 30 sets the write current when the magnetic head 22 passes through the second digit area to a negative current. Therefore, the controller 30 sets the write current when the magnetic head 22 passes through the first digit area to a positive current.

For example, the value written to the digit area D1 included in the track #n is "0". In a case where the digit area D1 is regarded as the first digit area, the digit area D2 included in the track #n+1 corresponds to the second digit area. The value written to the digit area D2 is "−1", so that the write current supplied to the magnetic head 22 when the magnetic head 22 passes through the digit area D2 is a negative current. Therefore, the controller 30 sets the write current supplied to the magnetic head 22 when the magnetic head 22 passes through the digit area D1 to a positive current. Here, the controller 30 supplies the write current of $WC_1$ to the magnetic head 22 in the digit area D1.

In another example, the value written to the digit area D3 included in the track #n is "0". In a case where the digit area D3 is regarded as the first digit area, the digit area D4 included in the track #n+1 corresponds to the second digit area. The value written to the digit area D4 is "1", so that the write current supplied to the magnetic head 22 when the magnetic head 22 passes through the digit area D4 is a positive current. Therefore, the controller 30 sets the write current supplied to the magnetic head 22 when the magnetic head 22 passes through the digit area D3 to a negative current. Here, the controller 30 supplies the write current of $WC_{-1}$ to the magnetic head 22 in the digit area D3.

As illustrated in FIG. 7, the controller 30 executes the write operation on the track #n+1 subsequent to the write operation on the track #n.

In the write operation on the track #n+1, in a case where the value to be written is "1", the controller 30 supplies a positive write current to the magnetic head 22, thereby magnetizing the digit area of the write destination to the positive polarity. In a case where the value to be written is "−1", the controller 30 supplies a negative write current to the magnetic head 22, thereby magnetizing the digit area of the write destination to the negative polarity.

In a case where the value to be written to the first digit area is "1" or "−1", the controller 30 determines the amount of current of the write current that is supplied to the magnetic head 22 when passing through the first digit area based on whether the value to be written to the third digit area is "0".

Specifically, in a case where the value to be written to the third digit area is "1" or "−1", the controller 30 sets the write current when the magnetic head 22 passes through the first digit area to $WC_1$ or $WC_{-1}$. In a case where the value to be written to the third digit area is "0", the controller 30 sets the write current when the magnetic head 22 passes through the first digit area to $WC_2$ or $WC_{-2}$.

As described above, the recording width in the radial direction by the magnetic head 22 when the write current of $WC_2$ or $WC_{-2}$ is supplied is larger than the recording width in the radial direction by the magnetic head 22 when the write current of $WC_1$ or $WC_{-1}$ is supplied. Thereby, the write operation on the first digit area magnetizes not only the first digit area but also a part of the third digit area.

The polarity of magnetization for the third digit area is opposite to the polarity of magnetization for the first digit area. Thus, the write operation on the first digit area inverts the polarity of an area of a part of the third digit area. As a result, in a case where the third digit area is read by the magnetic head 22, a signal at a level (referred to as a third level) different any of a level (referred to as a first level) obtained in a case where the entire digit area has a positive polarity and a level (referred to as a second level) obtained in a case where the entire digit area is negative is obtained. In the example illustrated in FIGS. 6 to 8, the first level corresponds to "1". The second level corresponds to "−1". The third level corresponds to "0".

For example, the value written to the digit area D2 is "−1". In a case where the digit area D2 is regarded as the first digit area, the digit area D1 included in the track #n corresponds to the third digit area. The value written to the digit area D1 is "0". Therefore, the controller 30 sets the write current supplied to the magnetic head 22 when the magnetic head 22 passes through the digit area D2 to $WC_{-2}$. The controller 30 supplies a write current of $WC_{-2}$ to the magnetic head 22 when the magnetic head 22 passes through the digit area D2, so that part (here, half) of the digit area D1 in the radial direction is inverted from a positive polarity to a negative polarity. As a result, the magnetization state of the digit area D1 is set to a state in which the signal of the third level is obtained in the read operation.

In another example, the value written to the digit area D4 is "1". In a case where the digit area D4 is regarded as the first digit area, the digit area D3 included in the track #n corresponds to the third digit area. The value written to the digit area D3 is "0". Therefore, the controller 30 sets the write current supplied to the magnetic head 22 when the magnetic head 22 passes through the digit area D3 to $WC_2$. The controller 30 supplies a write current of $WC_2$ to the magnetic head 22 when the magnetic head 22 passes through the digit area D4, so that part (here, half) of the digit area D3 is inverted from a negative polarity to a positive polarity. As a result, the magnetization state of the digit area D3 is set to a state in which the signal of the third level is obtained in the read operation.

In this way, the controller 30 determines according to the three values whether to set, as the magnetization state of the digit area, the entire digit area to a positive polarity, the entire digit area to a negative polarity, or only a part of the digit area to a positive polarity or a negative polarity. Then, in the read operation, by determining which of the first level, the second level, and the third level the level of the signal obtained from the magnetic head 22 corresponds to, the written value is acquired. As a result, it is possible to write/read ternary information.

In the write operation in the track #n+1 and any other track 41, in a case where the value to be written is "0", the controller 30 determines a direction of the write current supplied to the magnetic head 22 when the magnetic head 22 passes through the digit area (first digit area) of the write destination to be opposite to a direction of the write current supplied to the magnetic head 22 when the magnetic head 22 passes through the second digit area.

For example, the value written to the digit area D5 included in the track #n+1 is "0". In a case where the digit area D5 is regarded as the first digit area, the digit area D6 included in the track #n+2 corresponds to the second digit area. The value written to the digit area D6 is "1", so that the write current supplied to the magnetic head 22 when the magnetic head 22 passes through the digit area D6 is a positive current. Therefore, the controller 30 sets the write current supplied to the magnetic head 22 when the magnetic head 22 passes through the digit area D5 to a negative current. Here, the controller 30 supplies the write current of the $WC_{-1}$ to the magnetic head 22 in the digit area D5.

In addition, the value written to the digit area D7 included in the track #n+1 is "0". In a case where the digit area D7 is regarded as the first digit area, the digit area D8 included in the track #n+2 corresponds to the second digit area. The value written to the digit area D8 is "1", so that the write current supplied to the magnetic head 22 when the magnetic head 22 passes through the digit area D8 is a positive current. Therefore, the controller 30 sets the write current supplied to the magnetic head 22 when the magnetic head 22 passes through the digit area D7 to a negative current. Here, the controller 30 supplies the write current of the $WC_{-1}$ to the magnetic head 22 in the digit area D7.

As illustrated in FIG. 8, the controller 30 executes the write operation on the track #n+2 subsequent to the write operation on the track #n+1.

Also, in the write operation on the track #n+2, the direction and the amount of current of the write current in each digit area are set in the same manner as in the write operation on the track #n and the track #n+1. The direction and the amount of current of the write current in the first digit area are set based on a value to be written in the first digit area, a polarity of the write current in the second digit area, and a value to be written in the third digit area.

For example, the value written to the digit area D6 is "1". In a case where the digit area D6 is regarded as the first digit area, the digit area D5 included in the track #n+1 corresponds to the third digit area. The value written to the digit area D5 is "0". Therefore, the controller 30 sets the write current supplied to the magnetic head 22 when the magnetic head 22 passes through the digit area D6 to $WC_2$. The controller 30 supplies a write current of $WC_2$ to the magnetic head 22 when the magnetic head 22 passes through the digit area D6, so that part (here, half) of the digit area D5 is inverted from a negative polarity to a positive polarity. As a result, the magnetization state of the digit area D5 is set to a state in which the signal of the third level is obtained in the read operation.

In addition, for example, the value written to the digit area D8 is "1". In a case where the digit area D8 is regarded as the first digit area, the digit area D7 included in the track #n+1 corresponds to the third digit area. The value written to the digit area D7 is "0". Therefore, the controller 30 sets the write current supplied to the magnetic head 22 when the magnetic head 22 passes through the digit area D8 to $WC_2$. The controller 30 supplies a write current of $WC_2$ to the magnetic head 22 when the magnetic head 22 passes through the digit area D8, so that part (here, half) of the digit area D7 is inverted from a negative polarity to a positive polarity. As a result, the magnetization state of the digit area D7 is set to a state in which the signal of the third level is obtained in the read operation.

Figures 9, 10:
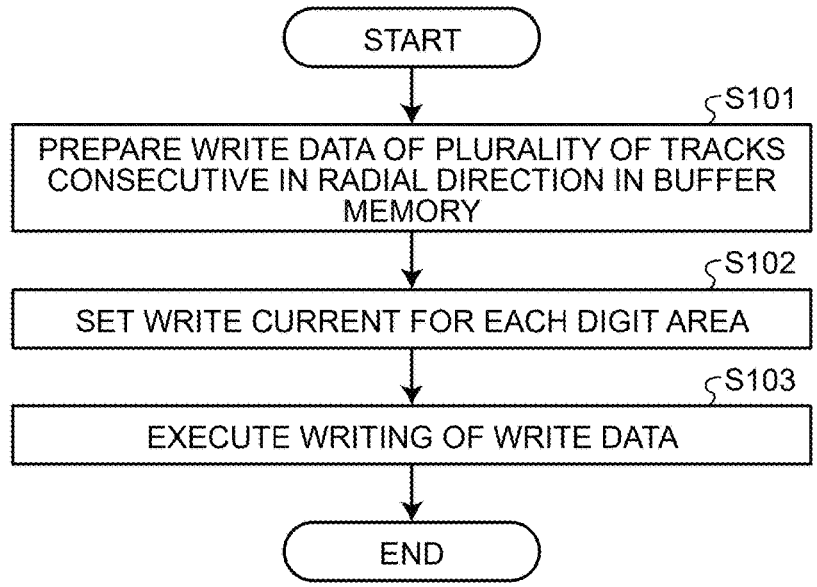
FIG. 9 is a diagram illustrating a list of write current setting patterns in two digit areas adjacent to each other in the radial direction in the first embodiment.
FIG. 10 is a diagram illustrating an example of a write operation of the magnetic disk device according to the first embodiment.

FIG. 9 is a diagram illustrating a list of setting patterns of write currents in two digit areas Da and Db adjacent to each other in the radial direction in the first embodiment. It is assumed that the digit area Da is included in the track #i, the digit area Db is included in the track #i+1, and the track #i+1 is the track 41 written after the track #i.

As illustrated in FIG. 9, in a case where the value written to the digit area Da is "1" or "−1", regardless of the value written to the digit area Db, the direction of the write current in the digit area Da is set according to only the value written to the digit area Da. In a case where the value written to the digit area Da is "1", the write current in the digit area Da is a positive current. In a case where the value written to the digit area Da is "−1", the write current in the digit area Da is a negative current.

In a case where the value written to the digit area Da is "0", the direction of the write current in the digit area Da is set according to the direction of the write current in the digit area Db. In a case where the value written to the digit area Da is "0" and the value written to the digit area Db is "1", the write current in the digit area Da is a negative current, and the write current in the digit area Db is a positive current. In a case where the value written to the digit area Da is "0" and the value written to the digit area Db is "−1", the write current in the digit area Da is a positive current, and the write current in the digit area Db is a negative current. In a case where the value to be written to the digit area Da is "0" and the value to be written to the digit area Db is "0", the direction of the write current in the digit areas Da and Db is set according to the direction of the write current in the digit area different from the digit area Da among two digit areas adjacent to the digit area Db in the radial direction. In FIG. 9, the direction of the write current in each of the digit areas Da and Db in a case where the value written to the digit area Da is "0" and the value written to the digit area Db is "0" is illustrated as undetermined.

The amount of current of the write current in the digit area Da is set according to whether a value written in a digit area (denoted as digit area Dc) different from the digit area Db among two digit areas adjacent to the digit area Da in the radial direction is "0". In a case where the value written to the digit area Dc is "1" or "−1", the write current in the digit area Da is $WC_1$ or $WC_{-1}$. In a case where the value to be written to the digit area Dc is "0", the write current in the digit area Da is set to $WC_2$ or $WC_{-2}$ in order to invert the polarity of a part of the digit area Dc.

Next, the operation of the magnetic disk device 1 of the first embodiment will be described.

FIG. 10 is a diagram illustrating an example of a write operation of the magnetic disk device 1 of the first embodiment.

First, the controller 30 prepares write data of a plurality of tracks consecutive in the radial direction in the buffer memory 29 (S101).

The write data prepared in S101 is information expressed in a ternary number. The controller 30 may receive data expressed in a binary number from the host 2 and generate write data expressed in ternary numbers by performing conversion on the received data expressed in binary numbers. The generation of the write data may be performed by the RWC 25 included in the controller 30. In such a case, the RWC 25 transmits write data with the previous track as a write destination to the head IC 24, and stores a copy of the write data in the buffer memory 29.

Alternatively, the controller 30 may receive write data expressed in a ternary number from the host 2 and store the received write data in the buffer memory 29.

Note that, in a case where, for example, p (p is an integer of 2 or more) digit areas to which "0" is written are arranged in the radial direction, unless a value to be written in a digit area adjacent to the digit areas to which the p "0" are written is determined to be either "1" or "−1", the direction of the write current in the p digit areas to which "0" is written cannot be set. Therefore, an upper limit value of the number of digit areas to which "0" is consecutively written in the radial direction is preset. The upper limit value is expressed as K (where K is an integer of 2 or more). That is, the write data of the plurality of tracks prepared in the buffer memory 29 in S101 is the write data generated under the constraint condition that the number of digit areas where "0" arranged consecutively in the radial direction is written is K or less.

The controller 30 sets a write current for each digit area based on the write data prepared in the buffer memory 29 (S102).

The controller 30 executes writing of the write data prepared in the buffer memory 29 to the magnetic disk 11 (S103). In S103, the controller 30 executes writing using the set write current.

After S103, the write operation ends.

Figure 11:
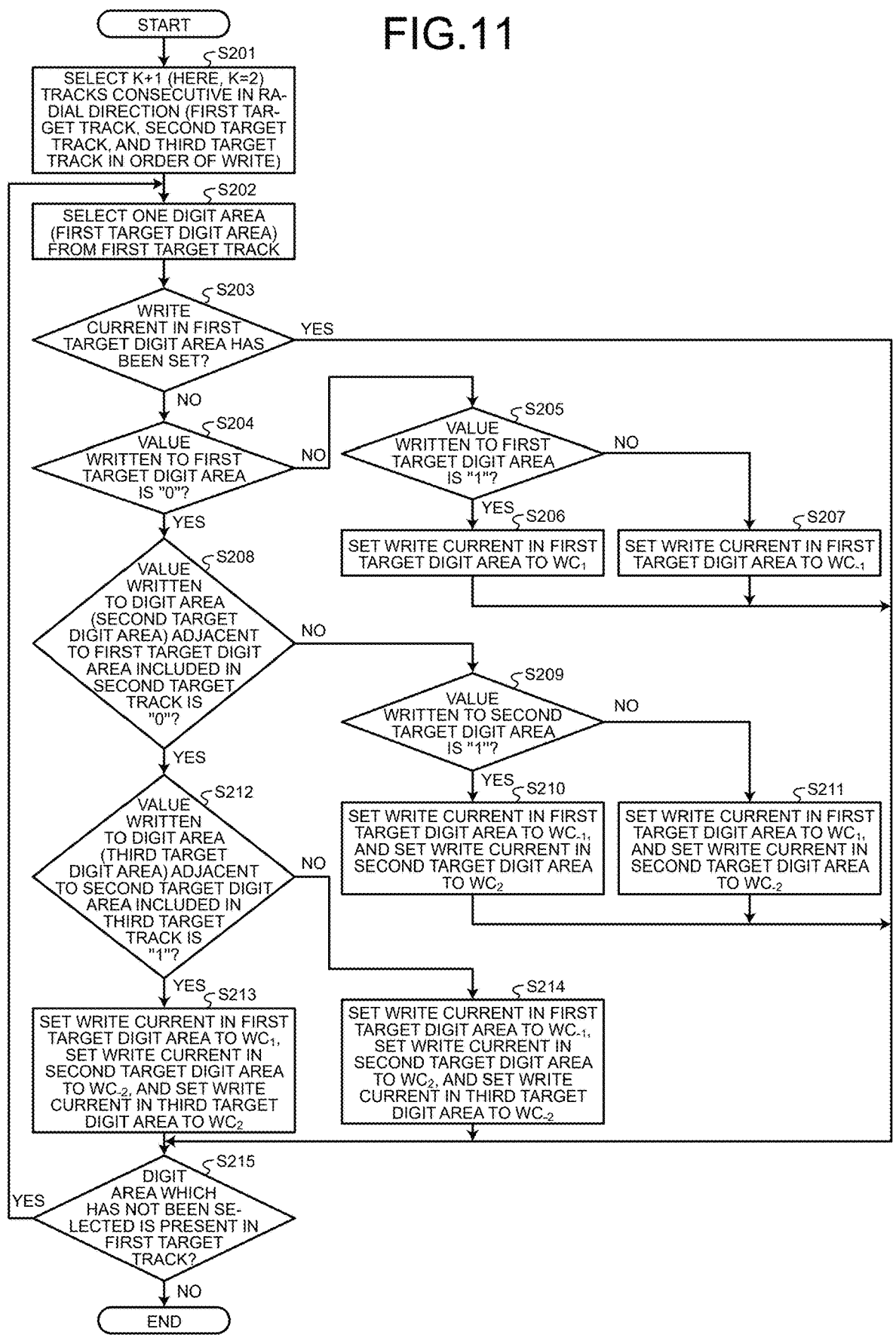
FIG. 11 is a flowchart illustrating an example of an operation of setting a write current according to the first embodiment.

FIG. 11 is a flowchart illustrating an example of an operation of setting a write current according to the first embodiment. A series of operations illustrated in this drawing is executed in the process of S102 illustrated in FIG. 10. Here, an operation of setting a write current for all digit areas included in one track 41 (a first target track to be described later) will be described. A series of operations illustrated in this drawing is referred to as a setting operation unit.

First, the controller 30 selects K+1 tracks 41 consecutive in the radial direction from among a plurality of tracks for which write data is prepared in the buffer memory 29 (S201). Here, K=2. That is, the controller 30 selects three tracks 41 consecutive in the radial direction. Among the three selected tracks 41, a track 41 a write order of which is the first is referred to as a first target track, a track 41 a write order of which is the second is referred to as a second target track, and a track 41 a write order of which is the last is referred to as a third target track.

Note that the write current is set for all the digit areas included in the first target track by one setting operation unit. In order to set the write current for all the digit areas included in all the tracks 41 included in one band area 130, the setting operation unit is repeatedly executed. The controller 30 changes the selected K+1 tracks 41 by one track 41 in a direction corresponding to the write order for each setting operation unit. For example, in a case where the track #r, the track #r+1, and the track #r+2 are selected in a certain setting operation unit, the track #r+1, the track #r+2, and the track #r+3 are selected in the next setting operation unit.

The controller 30 selects one digit area from the first target track (S202). The digit area selected in S202 is referred to as a first target digit area.

The controller 30 determines whether the write current in the first target digit area has been set (S203).

In one setting operation unit, the write current in the digit area included in the second target track or the digit area included in the third target track may be set by the processing of S210, S211, S213, or S214 described later. Therefore, in the digit area included in the track 41 selected as the first target track, there may be a digit area in which the write current is already set in the setting operation unit of the previous time or the setting operation unit of the time before last. In S203, the controller 30 determines whether the write current in the first target digit area has already been set in the setting operation unit of the previous time or the setting operation unit of the time before last.

In a case where the write current in the first target digit area has not been set (S203: No), the controller 30 determines whether the value written to the first target digit area is "0" (S204).

In a case where the value written to the first target digit area is not "0" (S204: No), the controller 30 determines whether the value written to the first target digit area is "1" (S205).

In a case where the value written to the first target digit area is "1" (S205: Yes), the controller 30 sets the write current in the first target digit area to $WC_1$ (S206).

In a case where the value written to the first target digit area is not "1" (S205: No), that is, in a case where the value written to the first target digit area is "−1", the controller 30 sets the write current in the first target digit area to $WC_{-1}$ (S207).

In a case where the value written to the first target digit area is "0" (S204: Yes), the controller 30 determines whether the value written to the digit area adjacent to the first target digit area included in the second target track is "0" (S208). The digit area adjacent to the first target digit area included in the second target track is referred to as a second target digit area.

In a case where the value written to the second target digit area is not "0" (S208: No), the controller 30 determines whether the value written to the second target digit area is "1" (S209).

In a case where the value written to the second target digit area is "1" (S209: Yes), the controller 30 sets the write current in the first target digit area to $WC_{-1}$, and sets the write current in the second target digit area to $WC_2$ (S210).

In a case where the value written to the second target digit area is not "1" (S209: No), that is, in a case where the value written to the second target digit area is "−1", the controller 30 sets the write current in the first target digit area to $WC_1$ and sets the write current in the second target digit area to $WC_{-2}$ (S211).

As described above, K is 2. Therefore, in a case where both the value written to the first target digit area and the value written to the second target digit area are "0" (S208: Yes), the value written to the digit area adjacent to the second target digit area included in the third target track is either "1" or "−1". A digit area adjacent to the second target digit area included in the third target track is referred to as a third target digit area. The controller 30 determines whether the value written to the third target digit area is "1" (S212).

In a case where the value to be written in the third target digit area is "1" (S212: Yes), the controller 30 sets the write current in the first target digit area to $WC_1$, sets the write current in the second target digit area to $WC_{-2}$, and sets the write current in the third target digit area to $WC_2$ (S213).

In a case where the value to be written in the third target digit area is not "1" (S212: No), that is, in a case where the value to be written in the third target digit area is "−1", the controller 30 sets the write current in the first target digit area to $WC_{-1}$, sets the write current in the second target digit area to WC, and sets the write current in the third target digit area to $WC_{-2}$ (S214).

In a case where the write current in the first target digit area has been set (S203: Yes), or after the processing of S206, S207, S210, S211, S213, or S214, the controller 30 determines whether there is a digit area that has not yet been selected as the first target digit area in the first target track (S215). In a case where there is a digit area that has not yet been selected as the first target digit area in the first target track (S215: Yes), the control transitions to S202, and the controller 30 selects any one digit area that has not yet been selected as the first target digit area as a new first target digit area.

In a case where there is no digit area that has not yet been selected as the first target digit area in the first target track (S215: No), one setting operation unit is completed.

A state in which "0" is written to the first digit area is determined by writing $WC_2$ or $WC_{-2}$ to the second digit area with a write current. In a case where the end track includes the digit area in which the value to be written is "0", the controller 30 provides an extra track adjacent to the end track, the extra track being located away from the head track relative to the end track, and writes the $WC_2$ or the $WC_{-2}$ to the extra track with the write current. In the radial direction, part or all of the extra track may be included in the guard area 140. However, it is prohibited that the extra track goes beyond the boundary of the guard area 140 into the adjacent band area 130.

Figure 12:
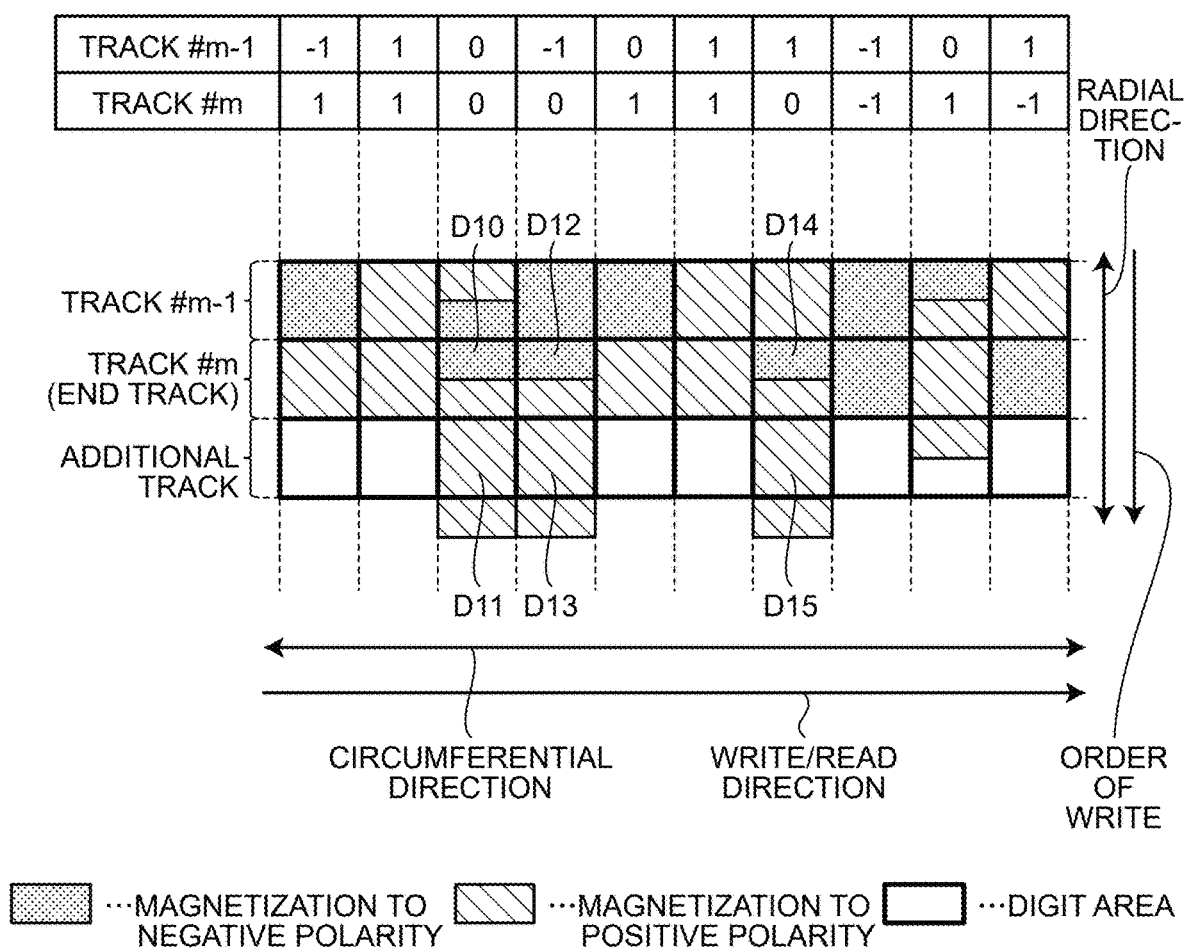
FIG. 12 is a diagram for describing an example of the write operation to an extra track according to the first embodiment.

FIG. 12 is a diagram for describing an example of the write operation to the extra track according to the first embodiment. In the drawing, the track #m is an end track in a certain band area 130, and the track #m−1 is a track 41 the write order of which is immediately before the track #m.

In the track #m, "0" is written to the digit areas D10, D12, and D14. Therefore, in order to bring each of the digit areas D10, D12, and D14 into a state in which the polarity of an area of a part of the digit area is inverted, the controller 30 provides an extra track adjacent to the track #m, and writes $WC_2$ or the $WC_{-2}$ to the digit areas D11, D13, and D15 of the extra track using the write current.

In the example illustrated in FIG. 12, setting is made in advance such that writing of $WC_2$ using the write current is performed for the extra track. Therefore, the controller 30 sets the write current of the digit areas D10, D12, and D14 as a negative write current according to the setting in advance. Then, the controller 30 writes $WC_2$ to the digit areas D11, D13, and D15 using the write current.

Note that the method of setting the write current at the time of writing to the extra track is not limited to the above.

In a case where "1" or "−1" is written to the digit area of the track #m, the controller 30 magnetizes the digit area of the write destination to a polarity corresponding to the value to be written of the positive polarity and the negative polarity. After magnetizing the write destination digit area to a positive polarity or a negative polarity, the controller 30 refrains from magnetization to the digit area adjacent to the write destination digit area in the extra track.

Note that, in the description of the first embodiment, the operation of magnetizing the first digit area using the write current of $WC_1$ or $WC_{-1}$, which is the operation of magnetizing the first digit area while suppressing the influence on the magnetization of the third digit area, is an example of the first magnetization operation. The recording width by the first magnetization operation, that is, the recording width in the radial direction by the magnetic head 22 when the write current of $WC_1$ or $WC_{-1}$ is supplied is an example of the first recording width.

The operation of magnetizing the digit area using the write current of $WC_2$ or $WC_{-2}$, which is the operation of magnetizing the first digit area while inverting the magnetization of a part of the third digit area, is an example of the second magnetization operation. The recording width by the second magnetization operation, that is, the recording width in the radial direction by the magnetic head 22 when the write current of $WC_2$ or $WC_{-2}$ is supplied is an example of the second recording width.

"1" is an example of a first value, and "−1" is an example of a second value. "0" is an example of a third value different any of the first value and the second value. The positive polarity is an example of the first polarity. The negative polarity is an example of the second polarity. The operation of writing "1" to the first digit area is an example of the first write operation. The operation of writing "−1" to the first digit area is an example of the second write operation. The operation of writing "0" to the first digit area is an example of a third write operation.

As described above, the magnetic disk device 1 of the first embodiment has the following features. That is, the magnetic head 22 can execute a magnetization operation of magnetizing the magnetic disk 11 to either a positive polarity or a negative polarity. The magnetization operation includes a first magnetization operation of magnetizing the disk with a first recording width and a second magnetization operation of magnetizing the disk with a second recording width larger than the first recording width. The controller 30 can execute any write operation of an operation of writing "1" to the first digit area (that is, a first write operation), an operation of writing "−1" to the first digit area (that is, a second write operation), and an operation of writing "0" to the first digit area (that is, a third write operation). In the first write operation, the controller 30 magnetizes the first digit area to a positive polarity in the first magnetization operation or the second magnetization operation. In the second write operation, the controller 30 magnetizes the first digit area to a negative polarity in the first magnetization operation or the second magnetization operation. In the third write operation, the controller 30 magnetizes the first digit area to a positive polarity or a negative polarity in the first magnetization operation or the second magnetization operation, and then magnetizes the second digit area to a polarity opposite to that of the first digit area in the second magnetization operation.

Therefore, values that can take three levels are written per digit area. That is, data is written to the magnetic disk 11 as information expressed in ternary numbers. As a result, it is possible to increase the storage capacity without increasing the number of digit areas as compared with the magnetic disk device according to the comparative example.

In addition, according to the first embodiment, in the third write operation, the controller 30 inverts the magnetization of a part of the first digit area by magnetizing the second digit area in the second magnetization operation.

Thus, the first digit area can have three states: a state in which the entire first digit area is magnetized to a positive polarity, a state in which the entire first digit area is magnetized to a negative polarity, and a state in which a part of the first digit area is magnetized to a positive polarity and the rest of the first digit area is magnetized to a negative polarity. As a result, values that can take three levels per digit area can be written.

Note that, according to the first embodiment, in the third write operation, the controller 30 identifies a value to be written in the second digit area, thereby identifying the direction of the write current used in the second digit area, that is, the polarity of the second digit area. Then, the controller 30 magnetizes the first digit area to a polarity opposite to the polarity of the second digit area.

Further, according to the first embodiment, in a case where the value written to the third digit area is "1" or "−1", the controller 30 magnetizes the first digit area in the first magnetization operation. In a case where the value written to the third digit area is "0" the controller 30 magnetizes the first digit area in the second magnetization operation.

Thus, the third digit area may have three states: a state in which the entire third digit area is magnetized to a positive polarity, a state in which the entire third digit area is magnetized to a negative polarity, and a state in which a part of the third digit area is magnetized to one polarity of the positive polarity and the negative polarity and the rest is magnetized to the other polarity of the positive polarity and the negative polarity. As a result, values that can take three levels per digit area can be written.

In addition, according to the first embodiment, in the first write operation, after the first digit area is magnetized to the positive polarity in the first magnetization operation or the second magnetization operation, in the first magnetization operation, the second digit area is magnetized to the positive polarity or the negative polarity in the first magnetization operation. In the second write operation, after the first digit area is magnetized to a negative polarity in the first magnetization operation or the second magnetization operation, in the first magnetization operation, the second digit area is magnetized to the positive polarity or the negative polarity in the first magnetization operation.

Thus, the first digit area is in a state in which the entire area is magnetized to a positive polarity or the entire area is magnetized to a negative polarity.

In addition, according to the first embodiment, write is executed in units of tracks 41 in the plurality of tracks 41 included in one band area 130 in one direction from the head track to the end track. As described with reference to FIG. 12, the controller 30 can execute an operation (referred to as a fourth write operation) of writing "0" in one digit area (referred to as a fourth digit area) included in the end track. In the fourth write operation, the controller 30 magnetizes the fourth digit area to either a positive polarity or a negative polarity in the first magnetization operation or the second magnetization operation, and then magnetizes the fifth digit area included in the extra track to a polarity opposite to that of the fourth digit area in the second magnetization operation of the fourth digit area. The fifth digit area is a digit area adjacent to the fourth digit area.

In addition, according to the first embodiment, as illustrated in FIG. 12, the controller 30 can execute an operation of writing "1" or "−1" to the fourth digit area (referred to as a fifth write operation). In the fifth write operation, the controller 30 magnetizes the fourth digit area to a positive polarity or a negative polarity in the first magnetization operation or the second magnetization operation for the fourth digit area, and then refrains from magnetization for the fifth digit area included in the extra track.

Furthermore, according to the first embodiment, in the first magnetization operation, the controller 30 supplies the write current of $WC_1$ or $WC_{-1}$ to the magnetic head 22. In the second magnetization operation, the controller 30 supplies the write current of $WC_2$ or $WC_{-2}$ having a larger amount of current than that in the first magnetization operation to the magnetic head 22.

Therefore, in the second magnetization operation, magnetization can be performed with a recording width larger than that in the first magnetization operation.

Second Embodiment

In the second embodiment, an example of an operation in which the controller 30 generates write data expressed in a ternary number will be described. Here, it is assumed that K=2. Note that the operation described in the second embodiment is executed, for example, in S101 of FIG. 10.

The controller 30 receives data expressed in a binary number from the host 2. The controller 30 converts the received data to generate write data expressed in ternary number. The operation of converting the binary data into the ternary data is executed in the RWC 25, for example. Note that this conversion operation may be executed in a circuit other than the RWC 25.

FIG. 13 is a diagram for describing an example of a method of generating write data executed by the controller 30 according to the second embodiment.

The controller 30 converts three-digit information expressed in a binary number into two-digit information expressed in a ternary number. Three-digit information expressed in a binary number can take eight values. Two-digit information expressed in a ternary number can take nine values. The controller 30 causes the eight values that can be taken by the three-digit information expressed in a binary number to correspond one-to-one to the eight values excluding "00" among the two-digit information expressed in the ternary number. Then, the controller 30 generates two-digit information expressed in a ternary number based on the correspondence relationship.

The controller 30 sets the value of the first digit in the generated two-digit information expressed in a ternary number as the write data of a certain track 41 (for example, the track #p), and sets the value of the second digit in the two-digit information as the write data of the track 41 (that is, the track #p+1) adjacent to the track #p.

Since the two-digit information expressed in a ternary number does not include "00", the write data generated as described above can satisfy the constraint condition that the number of digit areas in which "0" consecutively arranged in the radial direction is written is two or less.

Third Embodiment

When the polarity of an area of a part of the third digit area is inverted by the write operation on the first digit area, it is possible to further control the third level of the levels of the signal obtained from the third digit area to a plurality of levels in the read operation by controlling the ratio of the part to be inverted to the third digit area. That is, values that can take four or more levels per digit area can be written.

A third embodiment describes a technique that enables writing values that can take four levels per digit area. In the third embodiment, matters different from those in the first embodiment will be described. The same matters as those of the first embodiment will not be described or will be briefly described.

Figure 14:
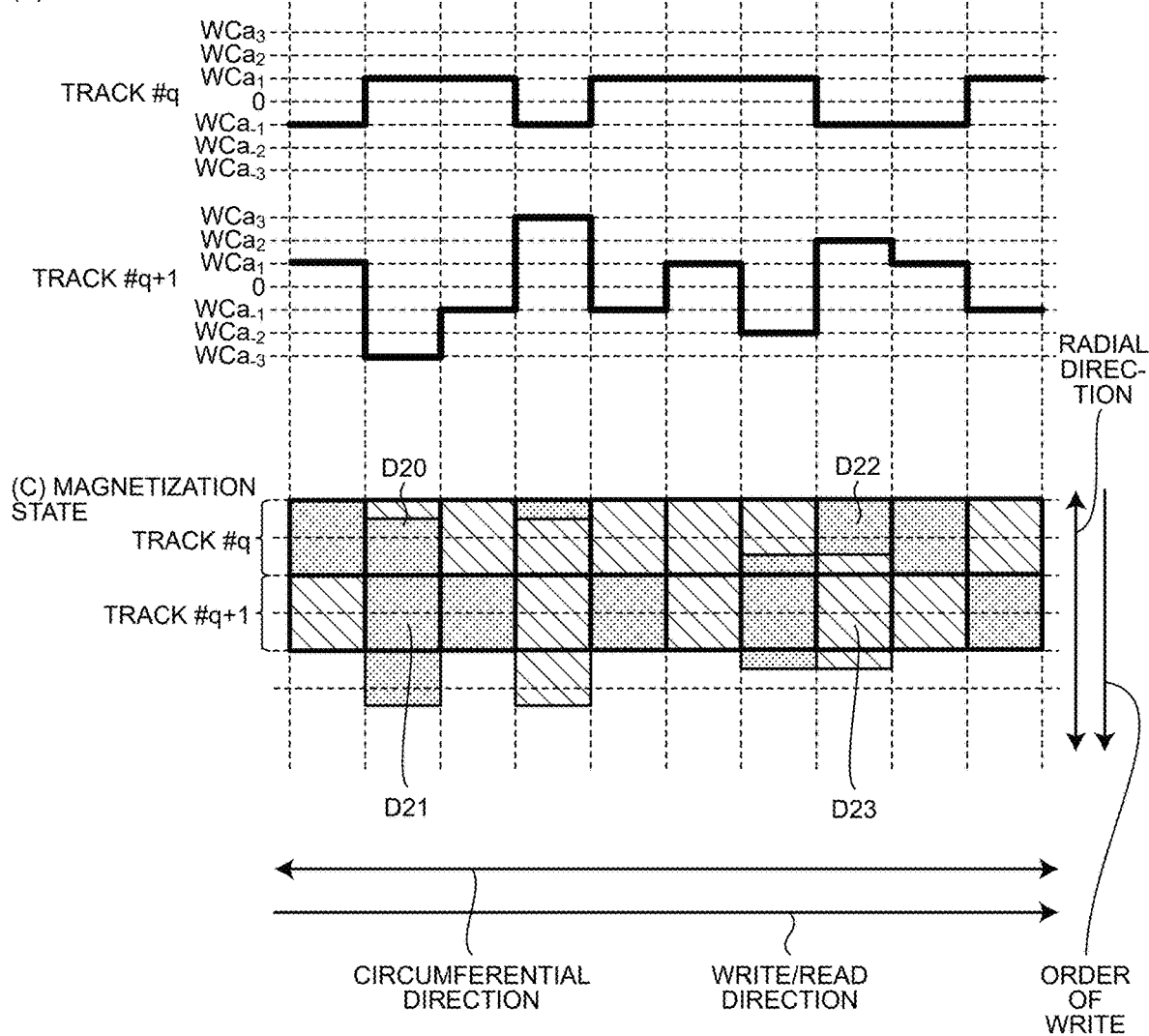
FIG. 14 is a diagram for describing a method of writing values that can take four levels according to a third embodiment.

FIG. 14 is a diagram for describing a method of writing values that can take four levels according to the third embodiment.

In the example illustrated in FIG. 14, a value written to one digit area may take "−1", "−0.3", "0.3", or "1". "1" is associated with a state in which the entire digit area has a positive polarity. "0.3" is associated with a state in which approximately $2/3$ of the digit area has a positive polarity. "−0.3" is associated with a state in which approximately $1/3$ of the digit area has a positive polarity. "−1" is associated with a state in which the entire digit area has negative polarity.

The controller 30 can control the amount of current of the write current supplied to the magnetic head 22 to $WCa_3$, $WCa_2$, $WCa_1$, $WCa_{-1}$, $WCa_{-2}$, and $WCa_{-3}$. $WCa_1$, $WCa_2$, and $WCa_3$ are positive write currents. The amount of current of $WCa_3$ is larger than the amount of current of $WCa_2$, and the amount of current of $WCa_2$ is larger than the amount of current of $WCa_1$. $WCa_{-1}$, $WCa_{-2}$, and $WCa_{-3}$ are negative write currents. The amount of current of $WCa_{-3}$ is substantially equal to the amount of current of $WCa_3$, the amount of current of $WCa_{-2}$ is substantially equal to the amount of current of $WCa_2$, and the amount of current of $WCa_{-1}$ is substantially equal to the amount of current of $WCa_1$.

Note that the recording width in the radial direction by the magnetic head 22 when the write current of WCa is supplied is substantially equal to the recording width in the radial direction by the magnetic head 22 when the write current of $WCa_{-1}$ is supplied. The recording width in the radial direction by the magnetic head 22 when the write current of $WCa_2$ is supplied is substantially equal to the recording width in the radial direction by the magnetic head 22 when the write current of $WCa_{-2}$ is supplied. The recording width in the radial direction by the magnetic head 22 when the write current of $WCa_3$ is supplied is substantially equal to the recording width in the radial direction by the magnetic head 22 when the write current of $WCa_{-3}$ is supplied.

Note that the amount of current of $WCa_{-3}$ may not be equal to the amount of current of $WCa_3$ as long as the same recording width can be obtained. Similarly, the amount of current of $WCa_{-2}$ may not be equal to the amount of current of $WCa_2$. Similarly, the amount of current of $WCa_{-1}$ may not be equal to the amount of current of $WCa_1$.

Furthermore, the recording width in the radial direction by the magnetic head 22 when the write current of $WCa_2$ or $WCa_{-2}$ is supplied is larger than the recording width in the radial direction by the magnetic head 22 when the write current of $WCa_1$ or $WCa_{-1}$ is supplied. The recording width in the radial direction by the magnetic head 22 when the write current of $WCa_3$ or $WCa_{-3}$ is supplied is larger than the recording width in the radial direction by the magnetic head 22 when the write current of $WCa_2$ or $WCa_{-2}$ is supplied.

Specifically, the recording width in the radial direction by the magnetic head 22 when the write current of $WCa_1$ or $WCa_{-1}$ is supplied is a recording width that can suppress the influence on the magnetism of the third digit area as much as possible. The recording width in the radial direction by the magnetic head 22 when the write current of $WCa_2$ or $WCa_{-2}$ is supplied is a recording width capable of magnetizing about $1/3$ of the third digit area. The recording width in the radial direction by the magnetic head 22 when the write current of $WCa_3$ or $WCa_{-3}$ is supplied is a recording width capable of magnetizing about $2/3$ of the third digit area.

As in the first embodiment, the write current direction and the amount of current in the first digit area are set based on a value written to the first digit area, a write current direction in the second digit area (in other words, a value written to the second digit area), and a value written to the third digit area.

For example, the value written to the digit area D20 is set to "−0.3". In a case where the digit area D20 is regarded as the first digit area, the digit area D21 corresponds to the second digit area. Since the value written to the digit area D21 is "−1", a negative write current is used in the digit area D21. Therefore, a positive write current is used in the digit area D20.

In a case where the digit area D21 is regarded as the first digit area, the digit area D20 corresponds to the third digit area. Under the condition that a positive write current is used in the digit area D20 and a negative write current is used in the digit area D21, the controller 30 uses a write current of $WCa_{-3}$ in the digit area D20 in order to make the digit area D20 into a state in which approximately $1/3$ of the area of the digit area D21 has a positive polarity, that is, a state corresponding to "−0.3".

In addition, for example, the value written to the digit area D22 is set to "−0.3". Since the value written to the digit area D23 is "1", a positive write current is used in the digit area D23. Therefore, a negative write current is used in the digit area D22.

Under the condition that a negative write current is used in the digit area D22 and a positive write current is used in the digit area D23, the controller 30 uses a write current of $WCa_2$ in the digit area D22 in order to make the digit area D22 into a state in which approximately $1/3$ of the digit area D23 has a positive polarity, that is, a state corresponding to "−0.3".

In the third embodiment, the operation of writing "1" to the first digit area is an example of the first write operation. The operation of writing "−1" to the first digit area is an example of the second write operation. The operation of writing "0.3" to the first digit area and the operation of writing "−0.3" to the first digit area are an example of the third write operation.

That is, in the third embodiment, in the third write operation, the controller 30 can write values that can take two levels per digit area by making the ratio of the part where the magnetization is inverted in the digit area different depending on whether the value to be written is "0.3" or "−0.3". That is, values that can take a total of four levels per digit area can be written by the first write operation, the second write operation, and the third write operation.

Note that, in the third write operation, the controller 30 can write values that can take three or more levels per digit area by the third write operation by having the three or more different ratios of the part where the magnetization is inverted in the digit area. That is, it is possible to write values that can take five or more levels in total per digit area by the first write operation, the second write operation, and the third write operation.

Fourth Embodiment

In the first to third embodiments, the recording width is controlled by controlling the magnitude of the write current supplied to the magnetic head 22. The method of controlling the recording width is not limited only to the method using the control of the magnitude of the write current supplied to the magnetic head 22.

As a method for magnetizing a magnetic disk, an energy-assisted recording method is known. The energy-assisted recording method is a method that allows magnetization of a magnetic disk even with a small write current by giving some energy to the magnetic disk.

Examples of the energy-assisted recording method include a microwave-assisted magnetic recording (MAMR) method and a heat-assisted magnetic recording (HAMR) method.

According to the microwave-assisted magnetic recording method, a magnetic field required for magnetization of a magnetic disk is reduced by applying microwaves to the magnetic disk. According to the heat-assisted magnetic recording method, the magnetic disk is locally heated by near-field light or the like, so that magnetic coercivity of the magnetic disk is reduced.

In a case where the energy-assisted recording method is used, the controller 30 can control the recording width by controlling an assist amount (hereinafter, the energy assist amount) by microwaves, heat, or the like. The controller 30 can increase the recording width as the energy assist amount is increased.

In the fourth embodiment, the magnetic head 22 includes an assist element capable of applying energy to the magnetic disk 11. The assist element is an element that generates microwaves or an element that generates near-field light. The controller 30 controls the energy assist amount, that is, the intensity of the microwave or the near-field light generated in the assist element.

Figure 15:
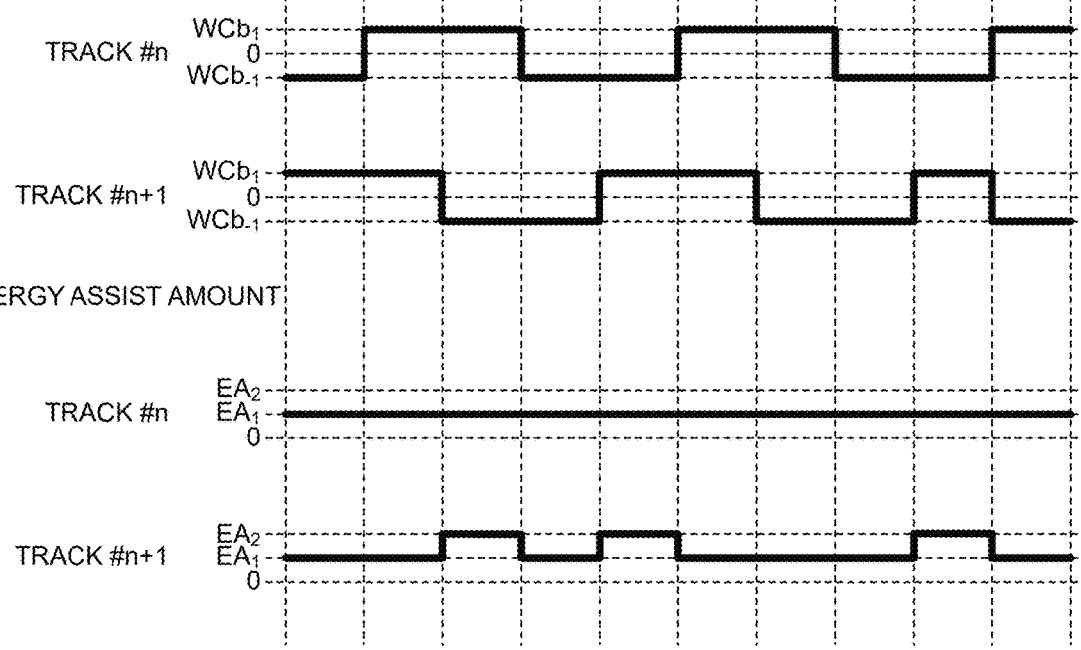
FIG. 15 is a diagram for describing an example of a recording width control method according to a fourth embodiment.

FIG. 15 is a diagram for describing an example of a recording width control method according to the fourth embodiment.

In FIG. 15, part (A) illustrates write data of the track #n and the track #n+1, part (B) illustrates a waveform of a write current, and part (C) illustrates a waveform of an energy assist amount. The write data of the track #n and the track #n+1 illustrated in part (A) is the same as the write data of the track #n and the track #n+1 illustrated in part (A) of FIGS. 6 to 8.

As illustrated in FIG. 15, the controller 30 can control the magnitude of the write current supplied to the magnetic head 22 to $WCb_1$ and $WCb_{-1}$. $WCb_1$ is a positive write current. $WCb_{-1}$ is a negative write current. The amount of current of $WCb_{-1}$ is equal to the amount of current of $WCb_1$.

In addition, the controller 30 can control the energy assist amount to $EA_1$ and $EA_2$.

The recording width in the radial direction by the magnetic head 22 in a case where the energy assist of $EA_1$ is performed when the write current of $WCb_1$ or $WCb_{-1}$ is supplied to the magnetic head 22 is a recording width that can suppress the influence of the third digit area on the magnetism area as much as possible. Furthermore, the recording width in the radial direction by the magnetic head 22 in a case where the energy assist of $EA_2$ is performed when the write current of $WCb_1$ or $WCb_{-1}$ is supplied to the magnetic head 22 is set to an extent that approximately half of the third digit area can be magnetized. That is, the recording width in the radial direction by the magnetic head 22 in a case where the energy assist of $EA_2$ is performed when the write current of $WCb_1$ or $WCb_{-1}$ is supplied to the magnetic head 22 is larger than the recording width in the radial direction by the magnetic head 22 in a case where the energy assist of $EA_1$ is performed when the write current of $WCb_1$ or $WCb_{-1}$ is supplied to the magnetic head 22.

The controller 30 sets the direction of the write current in the same manner as in the first embodiment. However, the controller 30 controls the energy assist amount in a plurality of stages instead of controlling the amount of current of the write current in a plurality of stages. Specifically, the controller 30 sets the energy assist amount to $EA_1$ instead of setting the write current to $WC_1$ or $WC_{-1}$. The controller 30 sets the energy assist amount to $EA_2$ instead of setting the write current to $WC_2$ or $WC_{-2}$. As a result, the same magnetization state as the magnetization state illustrated in part (C) of FIG. 7 can be realized.

That is, in the fourth embodiment, the operation of performing magnetization while applying the energy of $EA_1$ by the assist element corresponds to the first magnetization operation of performing magnetization with the first recording width. The operation of performing magnetization while applying energy of $EA_2$ larger than $EA_2$ by the assist element corresponds to the second magnetization operation of performing magnetization with the second recording width.

As described above, according to the fourth embodiment, the controller 30 gives the energy of $EA_1$ by the assist element in the first magnetization operation. In the second magnetization operation, the controller 30 gives energy of $EA_2$ larger than $EA_1$ by the assist element.

Therefore, by controlling the amount of energy applied from the assist element to the magnetic disk 11 in a plurality of stages, values that can take three levels can be written per digit area. As a result, it is possible to increase the storage capacity without increasing the number of digit areas as compared with the magnetic disk device according to the comparative example.

In the fourth embodiment, the energy assist amount is controlled to two levels of $EA_1$ and $EA_2$. The energy assist amount may be controlled to three or more levels. By controlling the energy assist amount to three or more levels, it is possible to write values that can take four or more levels per digit area as in the third embodiment, for example.

According to the first embodiment, the second embodiment, the third embodiment, and the fourth embodiment, the plurality of digit areas included in the magnetic disk 11 includes the following digit area by the controller 30 performing the above-described operation and the like. That is, the plurality of digit areas includes digit areas entirely magnetized to a positive polarity by the magnetic head 22. The plurality of digit areas includes digit areas entirely magnetized to a negative polarity by the magnetic head 22. The plurality of digit areas includes a digit area in which a part in the radial direction is magnetized to one polarity of the positive and the negative polarities and the rest is magnetized to the other polarity of the positive polarity and the negative polarity by the magnetic head 22.

In addition, according to the first embodiment, the second embodiment, the third embodiment, and the fourth embodiment, boundaries between the digit areas in the circumferential direction are aligned between a first track that is a certain track and a second track adjacent to the first track. This allows the digit area to be a state in which a part in the radial direction is magnetized to one polarity of the positive and negative polarities and the rest is magnetized to the other polarity of the positive polarity and the negative polarity.

In addition, according to the first embodiment, the second embodiment, the third embodiment, and the fourth embodiment, the number of digit areas in which the polarity of a partial area is inverted arranged in the radial direction is limited to a predetermined number (K in the above example) or less. For example, K is 2.

In addition, according to the first embodiment, in a case where the polarity of a partial area is inverted in each of the plurality of digit areas, the ratio R of the inverted part to the digit area is uniform in the plurality of digit areas. Specifically, the ratio R is approximately 0.5.

In addition, according to the third embodiment, in a case where the polarity of a partial area is inverted in each of the plurality of digit areas, the ratio R of the inverted part to the digit area is a first value or a second value. The first value is, for example, 0.3, and the second value is, for example, 0.7 (=1−0.3).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk provided with a plurality of tracks, each of the plurality of tracks including a plurality of area units arranged along a corresponding track;
    a magnetic head configured to execute a magnetization operation of magnetizing the magnetic disk to one of a first polarity and a second polarity that is a polarity opposite to the first polarity, the magnetization operation including a first magnetization operation of magnetizing the magnetic disk with a first recording width and a second magnetization operation of magnetizing the magnetic disk with a second recording width larger than the first recording width; and
    a controller configured to:
        be capable of executing any write operation of a first write operation of writing a first value to a first area unit that is one area unit included in a first track that is one track of the plurality of tracks, a second write operation of writing a second value different from the first value to the first area unit, and a third write operation of writing a third value different from the first and second values to the first area unit;
        in the first write operation, magnetize the first area unit to the first polarity in the first magnetization operation or the second magnetization operation;
        in the second write operation, magnetize the first area unit to the second polarity in the first magnetization operation or the second magnetization operation; and
        in the third write operation, magnetize the first area unit to either the first polarity or the second polarity in the first magnetization operation or the second magnetization operation, and then magnetize a second area unit to a polarity opposite to a polarity of the first area unit in the second magnetization operation, the second area unit being an area unit, radially adjacent to the first area unit, included in a second track that is a track adjacent to the first track among the plurality of tracks and to be written after the first track.

2. The magnetic disk device according to claim 1, wherein in the third write operation, the controller is configured to invert magnetization of a part of the first area unit by magnetizing the second area unit in the second magnetization operation.

3. The magnetic disk device according to claim 1, wherein in the third write operation, the controller is configured to identify a polarity of the second area unit and magnetize the first area unit to a polarity opposite to the identified polarity of the second area unit.

4. The magnetic disk device according to claim 1, wherein in the first write operation, the second write operation, and the third write operation, the controller is configured to:
    when a value to be written to a third area unit is the first value or the second value, magnetize the first area unit in the first magnetization operation, the third area unit being an area unit, radially adjacent to the first area unit, included in a third track that is a track adjacent to the first track among the plurality of tracks and to be written before the first track; and
    when the value to be written to the third area unit is the third value, magnetize the first area unit in the second magnetization operation.

5. The magnetic disk device according to claim 1, wherein the controller is configured to:
    in the first write operation, magnetize the first area unit to the first polarity in the first magnetization operation or the second magnetization operation, and then magnetize the second area unit to either the first polarity or the second polarity in the first magnetization operation; and
    in the second write operation, magnetize the first area unit to the second polarity in the first magnetization operation or the second magnetization operation, and then magnetize the second area unit to either the first polarity or the second polarity in the first magnetization operation.

6. The magnetic disk device according to claim 1, wherein the controller is configured to:
    perform writing to a plurality of fourth tracks consecutive in a radial direction among the plurality of tracks by a shingled magnetic recording (SMR) method, an order of write to the plurality of fourth tracks on a track unit basis being an order in a direction from a fifth track that is a fourth track at one end of the plurality of fourth tracks in the radial direction to a sixth track that is a fourth track at another end of the plurality of fourth tracks in the radial direction;
    be capable of executing a fourth write operation of writing the third value to a fourth area unit that is one area unit included in the sixth track; and
    in the fourth write operation, magnetize the fourth area unit to either the first polarity or the second polarity in the first magnetization operation or the second magnetization operation, and then magnetize a fifth area unit to a polarity opposite to a polarity of the fourth area unit in the second magnetization operation, the fifth area unit being an area unit, radially adjacent to the fourth area unit, included in a track opposite to a track toward the fifth track among two tracks adjacent to the sixth track.

7. The magnetic disk device according to claim 6, wherein the controller is configured to:
    be capable of executing a fifth write operation of writing the first value or the second value to the fourth area unit; and
    in the fifth write operation, magnetize the fourth area unit to the first polarity or the second polarity in the first magnetization operation or the second magnetization operation, and then refrain from magnetization for the fifth area unit.

8. The magnetic disk device according to claim 1, wherein the controller is configured to:
    supply a first amount of write current to the magnetic head in the first magnetization operation; and supply a second amount of write current larger than the first amount to the magnetic head in the second magnetization operation.

9. The magnetic disk device according to claim 1, wherein the magnetic head includes an assist element that applies energy to the magnetic disk, and
the controller is configured to:
apply a third amount of energy to the magnetic disk by the assist element in the first magnetization operation; and
apply a fourth amount of energy larger than the third amount to the magnetic disk by the assist element in the second magnetization operation.

10. The magnetic disk device according to claim 1, wherein
the third value includes a plurality of different fourth values, and
in the third write operation, the controller is configured to make a ratio of a part for inverting magnetization in the first area unit to the first area unit different for each of the plurality of fourth values.

11. A magnetic disk device comprising:
a magnetic disk provided with a plurality of tracks, each of the plurality of tracks including a plurality of area units arranged along a corresponding track; and
a magnetic head configured to magnetize the magnetic disk, the plurality of area units including:
a first area unit entirely magnetized to a first polarity by the magnetic head;
a second area unit entirely magnetized to a second polarity that is a polarity opposite to the first polarity; and
a third area unit a part of which in a radial direction is magnetized to one polarity of the first polarity and the second polarity and a rest of which is inverted by another polarity of the first polarity and the second polarity, by the magnetic head, wherein
a boundary between the plurality of area units included in a first track that is one track of the plurality of tracks and a boundary between the plurality of area units included in a second track that is one track adjacent to the first track of the plurality of tracks are aligned.

12. The magnetic disk device according to claim 11, wherein
a number of the third area units arranged in the radial direction is limited to two or less.

13. The magnetic disk device according to claim 11, wherein
the plurality of area units includes a plurality of fourth area units corresponding to the third area unit, and a ratio of a part inverted by the other polarity in the radial direction to an area unit is uniform among the plurality of area units.

14. The magnetic disk device according to claim 13, wherein
the ratio includes 0.5.

15. The magnetic disk device according to claim 11, wherein
the plurality of area units includes a plurality of fourth area units corresponding to the third area unit, and in each of the plurality of area units, a ratio of a part inverted by the other polarity in the radial direction to an area unit is a first value or a second value.

16. The magnetic disk device according to claim 15, wherein
the first value includes 0.3 and the second value includes 0.7.

* * * * *